United States Patent
Okano

(10) Patent No.: US 8,576,499 B2
(45) Date of Patent: Nov. 5, 2013

(54) IMAGING LENS AND IMAGING APPARATUS

(75) Inventor: Hideaki Okano, Aichi (JP)

(73) Assignee: Sony Corporation, Tokyo (JP)

( * ) Notice: Subject to any disclaimer, the term of this patent is extended or adjusted under 35 U.S.C. 154(b) by 4 days.

(21) Appl. No.: 13/285,567

(22) Filed: Oct. 31, 2011

(65) Prior Publication Data

US 2012/0147248 A1 Jun. 14, 2012

(30) Foreign Application Priority Data

Dec. 14, 2010 (JP) ................................ 2010-278527

(51) Int. Cl.
G02B 3/02 (2006.01)
G02B 13/18 (2006.01)
G02B 9/34 (2006.01)

(52) U.S. Cl.
CPC .......................................... G02B 9/34 (2013.01)
USPC .......................................................... 359/715

(58) Field of Classification Search
USPC .......... 359/642–644, 745–747, 771–773, 715
See application file for complete search history.

(56) References Cited

U.S. PATENT DOCUMENTS

| 7,408,723 B1* | 8/2008 | Lin ............................... 359/715 |
| 2010/0097709 A1* | 4/2010 | Tsai ............................... 359/715 |
| 2010/0172024 A1 | 7/2010 | Sakagami |
| 2011/0115962 A1* | 5/2011 | Chen et al. ..................... 348/335 |
| 2012/0293875 A1* | 11/2012 | Tsai et al. ....................... 359/715 |

FOREIGN PATENT DOCUMENTS

| JP | 2002-365530 | 12/2002 |
| JP | 2002-365531 | 12/2002 |
| JP | 2004-004566 | 1/2004 |
| JP | 2006-293324 | 10/2006 |
| JP | 2007-219079 | 8/2007 |
| JP | 2009-069163 | 4/2009 |

OTHER PUBLICATIONS

Extended European Search Report issued Mar. 14, 2012 for corresponding European Application No. 11 18 9893.

* cited by examiner

*Primary Examiner* — Scott J Sugarman
*Assistant Examiner* — Robert E Tallman
(74) *Attorney, Agent, or Firm* — Rader, Fishman & Grauer PLLC

(57) ABSTRACT

An imaging lens includes: an aperture stop; a first lens having a positive refractive power; a second lens having a negative refractive power which is formed in a concave shape on both sides thereof; a third lens having a positive refractive power which is formed in a meniscus shape in which a concave surface is directed toward the side of an object; and a fourth lens having a negative refractive power in which a convex surface is directed toward the object side, which are sequentially disposed from the object side to the image side, wherein the imaging lens satisfies the following conditional expressions (1), (2), (3) and (4):

$0.40 < |f1/f2| < 0.80$      (1)

$0.10 < f/f3 < 0.80$      (2)

$0.20 < |f/f4| < 1.00$      (3)

$vd1 - vd2 > 25.$      (4)

12 Claims, 21 Drawing Sheets

IMAGING LENS AND IMAGING APPARATUS

FIELD

The present disclosure relates to an imaging lens and an imaging apparatus. More particularly, the present disclosure relates to a technical field of an imaging lens which is suitable for a small sized apparatus such as a digital still camera or a mobile phone mounted with a camera including an imaging device, and an imaging apparatus including the imaging lens.

BACKGROUND

A mobile phone with an attached camera, a digital still camera or the like including an imaging device (solid state imaging device) such as a CCD (Charge Coupled Device) or a CMOS (Complementary Metal Oxide Semiconductor) has been used as an imaging apparatus.

In such an imaging apparatus, there is demand for miniaturization. Further, in an imaging lens mounted in the imaging apparatus, there is also demand for a small size and a short total optical length.

Further, in recent years, in a small sized imaging apparatus such as a mobile phone with an attached camera, as miniaturization has been facilitated and a high pixel density imaging device has been developed, imaging apparatus models mounted with an imaging device of a high pixel density which is equivalent to a digital still camera have become widespread. Thus, a high pixel density lens performance corresponding to the high pixel density imaging device is demanded in an imaging lens to be mounted.

Further, in order to prevent deterioration of image quality due to noise in photographing in dark places, there is demand for a lens with a bright F-number.

Under these circumstances, in the related art, the following imaging lenses have been proposed (for example, JP-A-2004-4566, JP-A-2002-365530, JP-A-2002-365531, JP-A-2006-293324, JP-A-2007-219079, and JP-A-2009-69163).

SUMMARY

An imaging lens disclosed in JP-A-2004-4566 has a three-lens structure and a short total optical length is advantageous. However, with the three-lens structure, it is difficult to satisfy the demand for a high resolution lens due to the high pixel density imaging device as described above and of small chromatic aberration, and to secure excellent optical performance corresponding to an imaging device with a high pixel density.

An imaging lens disclosed in JP-A-2002-365530 and JP-A-2002-365531 has a four-lens structure and is capable of reliably correcting various aberrations, but has a long total optical length and thus does not satisfy the demand for miniaturization. Further, since the positive refractive power of the first lens and the negative refractive power of the second lens are strong, the eccentric sensitivity is high and assembly efficiency is lowered, which may result in deterioration of optical performance.

An imaging lens disclosed in JP-A-2006-293324 has a four-lens structure and has a high aberration correction capability, but has a long total optical length and thus does not satisfy the demand for miniaturization. Further, since a third lens has a convex shape on both sides, it is difficult to correct aberration. Further, ghosting may occur when peripheral light beams are totally reflected, which may result in deterioration of optical performance to lower image quality.

An imaging lens disclosed in JP-A-2007-219079 has a four-lens structure and is capable of reliably correcting various aberrations, and particularly, field curvature, but has a long total optical length and thus does not satisfy the demand for miniaturization. Further, since the second lens is formed in a concave meniscus shape in which a convex portion is directed toward the object side, ghosting may occur, which may result in deterioration of optical performance to lower image quality. Further, since the refractive power of the second lens is weak, chromatic aberration is not sufficiently corrected, which may cause deterioration of optical performance. In addition, since the positive refractive power of the third lens and a negative refractive power of a fourth lens are strong, the eccentric sensitivity between the first lens and the second lens is high and assembly efficiency is lowered, which may result in deterioration of optical performance.

An imaging lens disclosed in JP-A-2009-69163 has a four-lens structure and is capable of reliably correcting various aberrations, but has a long total optical length and thus does not satisfy the demand for miniaturization. Further, since the refractive power of the second lens is weak, chromatic aberration is not sufficiently corrected, which may cause deterioration of optical performance. Further, since the positive refractive power of the third lens and the negative refractive power of the fourth lens are strong, the eccentric sensitivity between the first lens and the second lens is high and assembly efficiency is lowered, which may result in deterioration of optical performance.

Accordingly, it is desirable to provide an imaging lens and an imaging apparatus which are capable of securing an excellent optical performance corresponding to a high pixel density imaging device and of achieving miniaturization.

An embodiment of the present disclosure is directed to an imaging lens including an aperture stop, a first lens having a positive refractive power, a second lens having a negative refractive power which is formed in a concave shape on both sides thereof, a third lens having a positive refractive power which is formed in a meniscus shape in which a concave surface is directed toward the object side, and a fourth lens having a negative refractive power in which a convex surface is directed toward the object side, which are sequentially disposed from the object side to the image side. Here, the imaging lens satisfies the following conditional expressions (1), (2), (3) and (4):

$$0.40 < |f1/f2| < 0.80 \qquad (1)$$

$$0.10 < f/f3 < 0.80 \qquad (2)$$

$$0.20 < |f/f4| < 1.00 \qquad (3)$$

$$vd1 - vd2 > 25. \qquad (4)$$

where f1 is the focal length of the first lens, f2 is the focal length of the second lens, f3 is the focal length of the third lens, f4 is the focal length of the fourth lens, f is the focal length of an entire lens system, vd1 is the Abbe number of the first lens, and vd2 is the Abbe number of the second lens.

With this configuration, focal lengths are appropriately distributed between the first lens having the positive refractive power, the second lens having the negative refractive power, the third lens having the positive refractive power and the fourth lens having the negative refractive power, in the imaging lens.

In the above-described imaging lens, it is preferable that the imaging lens satisfy the following conditional expression (5):

$$1.50 < R6/R7 < 4.00 \quad (5)$$

where R6 is the paraxial curvature radius of the surface on the object side of the third lens, and R7 is the paraxial curvature radius of a surface on the image side of the third lens.

As the imaging lens satisfies the conditional expression (5), the size of the paraxial curvature radius on the object side of the third lens becomes optimal, and the difference between the paraxial curvature radii of the surface on the object side of the third lens and the surface on the image side thereof is prevented from being large.

In the above-described imaging lens, it is preferable that the aperture stop be disposed between the top of the surface on the object side of the first lens in the optical axis direction and the effective diameter thereof.

As the aperture stop be disposed between the top of the surface on the object side of the first lens in the optical axis direction and the effective diameter thereof, the amount of peripheral light entering the first lens is increased.

In the above-described imaging lens, it is preferable that the imaging lens satisfy the following conditional expression (6):

$$5.00 < |f4|/D8 < 30.00 \quad (6)$$

where D8 is the center thickness of the fourth lens.

As the imaging lens satisfies the conditional expression (6), the center thickness of the fourth lens becomes optimal.

In the above-described imaging lens, it is preferable that the imaging lens satisfy the following conditional expression (7):

$$1.00 < R4/f2 < 30.00 \quad (7)$$

where R4 is the paraxial curvature radius of the surface on the object side of the second lens.

As the imaging lens satisfies the conditional expression (7), the size of the paraxial curvature radius of the surface on the object side of the second lens becomes optimal.

Another embodiment of the present disclosure is directed to an imaging apparatus including an imaging lens and an imaging device which converts an optical image formed by the imaging lens into an electrical signal, the imaging lens including an aperture stop, a first lens having a positive refractive power, a second lens having a negative refractive power which is formed in a concave shape on both sides thereof, a third lens having a positive refractive power which is formed in a meniscus shape in which a concave surface is directed toward the object side, and a fourth lens having a negative refractive power in which a convex surface is directed toward the object side, which are sequentially disposed from the object side to the image side, wherein the imaging lens satisfies the following conditional expressions (1), (2), (3) and (4):

$$0.40 < f1/|f2| < 0.80 \quad (1)$$

$$0.10 < f/f3 < 0.80 \quad (2)$$

$$0.20 < f/|f4| < 1.00 \quad (3)$$

$$vd1 - vd2 > 25. \quad (4)$$

where f1 is the focal length of the first lens, f2 is the focal length of the second lens, f3 is the focal length of the third lens, f4 is the focal length of the fourth lens, f is the focal length of an entire lens system, vd1 is the Abbe number of the first lens, and vd2 is the Abbe number of the second lens.

With this configuration, focal lengths are appropriately distributed between the first lens having the positive refractive power, the second lens having the negative refractive power, the third lens having the positive refractive power and the fourth lens having the negative refractive power, in the imaging lens of the imaging apparatus.

According to the imaging lens and the imaging apparatus of the embodiments of the present disclosure, it is possible to secure an excellent optical performance corresponding to a high pixel density imaging device and to achieve miniaturization.

DETAILED DESCRIPTION

Figure 1:
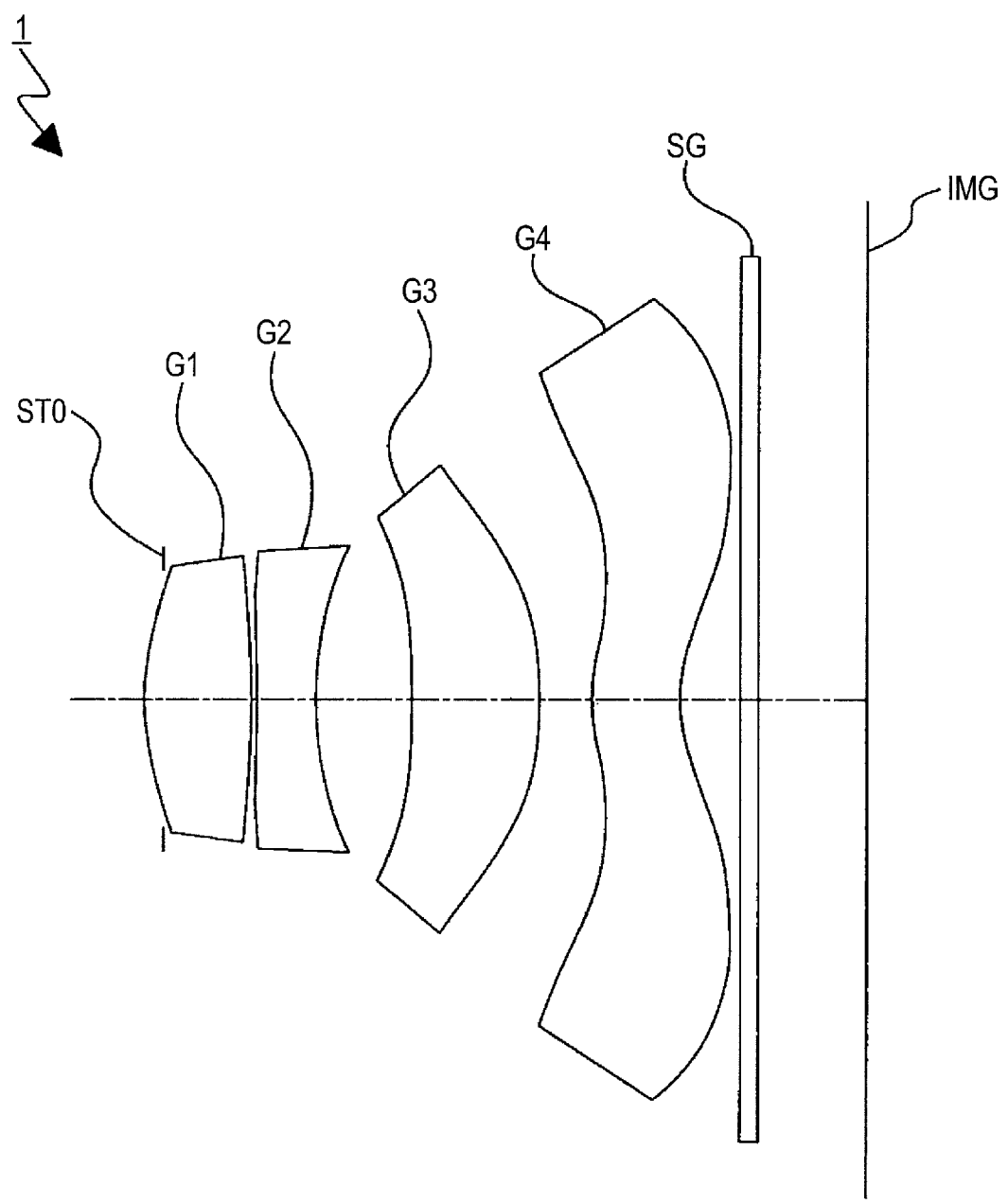
FIG. 1 is a diagram illustrating a lens configuration of an imaging lens according to a first embodiment.

Hereinafter, preferred embodiments for an imaging lens and an imaging apparatus of the present disclosure will be described.

[Configuration of Imaging Lens]

The imaging lens according to the embodiment of the present disclosure includes an aperture stop, a first lens having a positive refractive power, a second lens having a negative refractive power which is formed in a concave shape on both sides thereof, a third lens having a positive refractive power which is formed in a meniscus shape in which a concave surface is directed toward the object side, and a fourth lens having a negative refractive power in which a convex surface is directed toward the object side, which are sequentially disposed from the object side to the image side.

Accordingly, the positive, negative, positive and negative refractive powers are disposed in the imaging lens, to form an arrangement configuration in which the positive refractive power proceeds.

By forming the second lens in the concave shape on both sides, total reflection ghosting due to off-axis light beams diffuses in a peripheral portion of the lens, so that the ghosting light is prevented from being incident to an imaging device such as a CCD or CMOS, which is effective in correction of coma aberration.

Forming the third lens in the meniscus shape having the positive refractive power is effective in aberration correction, and particularly, is effective in field curvature and astigmatism.

By forming the fourth lens having the negative refractive power in the shape of which the convex surface is directed toward the object side, ghosting light which enters a peripheral portion of the fourth lens is prevented from being incident to the imaging device such as a CCD or CMOS by being reflected from the surface thereof on the object side.

Further, the imaging lens according to the embodiment of the present disclosure satisfies the following conditional expressions (1), (2), (3) and (4).

$$0.40 < f1/|f2| < 0.80 \quad (1)$$

$$0.10 < f/f3 < 0.80 \quad (2)$$

$$0.20 < f/|f4| < 1.00 \quad (3)$$

$$vd1 - vd2 > 25. \quad (4)$$

Here, f1 is the focal length of the first lens, f2 is the focal length of the second lens, f3 is the focal length of the third lens, f4 is the focal length of the fourth lens, f is the focal length of an entire lens system, vd1 is the Abbe number of the first lens, and vd2 is the Abbe number of the second lens.

The conditional expression (1) is a conditional expression relating to an appropriate refractive power distribution of the second lens in the refractive power of the first lens. The reason why the absolute value is used in the focal length of the second lens is because the second lens has the negative refractive power. By setting the first lens and the second lens to have the refractive power arrangement shown in the conditional expression (1), it is possible to obtain an excellent aberration correction effect.

If f1/|f2| is beyond the upper limit of the conditional expression (1), the refractive power of the second lens becomes excessively strong, and it is thus difficult to correct off-axis aberration, and particularly to correct astigmatism and field curvature, which consequently lowers assembly efficiency at the time of manufacturing.

On the other hand, if f1/|f2| is beyond the lower limit of the conditional expression (1), the refractive power of the second lens becomes excessively weak, and it is thus disadvantageous in reduction of the total optical length, which is disadvantageous in miniaturization. Further, it is disadvantageous in correction of chromatic aberration, which makes it difficult to secure an excellent optical performance suitable for a high pixel density imaging device.

For this reason, the imaging lens satisfies the conditional expression (1), and thus, it is possible to achieve miniaturization and to secure an excellent optical performance suitable for a high pixel density imaging device.

The conditional expression (2) is a conditional expression relating to an appropriate refractive power distribution of the third lens in the refractive powers of the lenses of the entire system.

If f/f3 is beyond the upper limit of the conditional expression (2), the refractive power of the third lens becomes excessively strong, and it is thus difficult to correct off-axis aberration, and particularly to correct astigmatism and field curvature, which consequently lowers assembly efficiency at the time of manufacturing.

On the other hand, if f/f3 is beyond the lower limit of the conditional expression (2), the refractive power of the third lens becomes excessively weak, and it is thus disadvantageous in reduction of the total optical length, which is disadvantageous in miniaturization.

For this reason, the imaging lens satisfies the conditional expression (2), and thus, it is possible to achieve miniaturization and to secure an excellent aberration correction performance to thereby secure an excellent optical performance.

The conditional expression (3) is a conditional expression relating to an appropriate refractive power distribution of the fourth lens in the refractive powers of the lenses of the entire system. The reason why the absolute value is used in the focal length of the fourth lens is because the fourth lens has the negative refractive power.

If f/|f4| is beyond the upper limit of the conditional expression (3), the refractive power of the fourth lens becomes excessively strong, and it is thus difficult to correct off-axis aberration, and particularly to correct field curvature and distortion, which consequently lowers assembly efficiency at the time of manufacturing.

On the other hand, if f/|f4| is beyond the lower limit of the conditional expression (3), the refractive power of the fourth lens becomes excessively weak, and it is thus disadvantageous in reduction of the total optical length, which results in deterioration of miniaturization.

For this reason, the imaging lens satisfies the conditional expression (3), and thus, it is possible to achieve miniaturization and to secure an excellent aberration correction performance to thereby secure an excellent optical performance.

The conditional expression (4) is a conditional expression for regulating Abbe numbers in the short wavelength of the d-line of the first lens and the second lens.

By using a glass material in which the Abbe number is in the range of the conditional expression (4) as the first lens and the second lens, it is possible to perform an excellent chromatic aberration correction. Further, it is possible to suppress occurrence of peripheral coma aberration and field curvature.

As described above, since the imaging lens according to the embodiment of the present disclosure satisfies the conditional expressions (1), (2), (3) and (4), the distribution of the focal lengths of the first lens having the positive refractive power, the second lens having the negative refractive power, the third lens having the positive refractive power and the fourth lens having the negative refractive power is appropriately performed.

Accordingly, it is possible to realize an imaging lens in which axial chromatic aberration, spherical aberration and field curvature are reliably corrected, whose total optical length is reduced, and which achieves an excellent optical performance.

Specifically, it is possible to realize an imaging lens in which the focal length is 24 mm to 35 mm in 35 mm version, the value of the F-number is 2.1 to 2.6, and the total optical length with respect to the diagonal length (length from the center of the imaging device to an opposing angle) of the imaging device is 1.4 to 2.0.

As described above, since the value of the F-number is 2.1 to 2.6, the focal length in 35 mm version is 24 mm to 35 mm, and the total optical length with respect to the diagonal length of the imaging device is 1.4 to 2.0, it is possible to reduce the total optical length and to realize a bright optical system.

It is preferable that the imaging lens according to the embodiment of the present disclosure satisfy the following conditional expression (5).

$$1.50 < R6/R7 < 4.00 \quad (5)$$

Here, $R6$ is the paraxial curvature radius of the surface on the object side of the third lens, and $R7$ is the paraxial curvature radius of the surface on the image side of the third lens.

The conditional expression (5) is a conditional expression relating to the paraxial curvature radius of the surface on the object side of the third lens, and the paraxial curvature radius of the surface on the image side of the third lens.

If $R6/R7$ is beyond the upper limit of the conditional expression (5), the paraxial curvature radius on the object side of the third lens is excessively large, and it is thus difficult to correct off-axis aberration. Further, the paraxial curvature radius difference between the surface on the object side of the third lens and the surface on the image side thereof is increased, which significantly lowers manufacturing efficiency of the lens.

On the other hand, if $R6/R7$ is beyond the lower limit of the conditional expression (5), the paraxial curvature radius difference between the surface on the object side of the third lens and the surface on the image side thereof is increased, which significantly lowers manufacturing efficiency of the lens.

For this reason, the imaging lens satisfies the conditional expression (5), and thus, it is possible to reliably correct off-axis aberration, and to achieve high manufacturing efficiency of the lens.

It is preferable that the value of the paraxial curvature radius ($R6$) on the surface of the object side of the third lens be −12.424 mm to −3.254 mm. Further, it is preferable that the value of the paraxial curvature radius ($R7$) of the surface on the image side of the third lens be −5.446 mm to −1.926 mm.

In the imaging lens according to the embodiment of the present disclosure, it is preferable to dispose the aperture stop between the top of the surface on the object side of the first lens in the optical axis direction and the effective radius thereof.

In the imaging lens according to the embodiment of the present disclosure, a front-stop configuration is adopted, in which by setting the position of the aperture stop in the range from the top of the surface on the object side of the first lens in the optical axis direction to the effective radius thereof, it is possible to increase the amount of peripheral light, compared with a case where the aperture stop is disposed on the object side from the top of the surface of the object side of the first lens. Further, it is possible to reduce the total optical length and to achieve miniaturization.

In the imaging lens according to the embodiment of the present disclosure, it is preferable to satisfy the following conditional expression (6).

$$5.00 < |f4|/D8 < 30.00 \quad (6)$$

Here, $D8$ is the central thickness of the fourth lens.

The conditional expression (6) is a conditional expression relating to the refractive power of the fourth lens and the central thickness of the fourth lens.

If $|f4|/D8$ is beyond the upper limit of the conditional expression (6), the central thickness of the fourth lens becomes excessively thin, which consequently lowers assembly efficiency of the fourth lens.

On the other hand, if $|f4|/D8$ is beyond the lower limit of the conditional expression (6), the refractive power of the fourth lens becomes excessively strong, and it is thus difficult to reliably correct aberration, and particularly to correct field curvature and distortion, which consequently lowers assembly efficiency at the time of manufacturing.

In the imaging lens according to the embodiment of the present disclosure, it is preferable to satisfy the following conditional expression (7).

$$1.00 < R4/f2 < 30.00 \quad (7)$$

Here, $R4$ is the paraxial curvature radius of the surface on the object side of the second lens.

The conditional expression (7) is a conditional expression relating to the paraxial curvature radius of the surface on the object side of the second lens and the refractive power of the second lens.

If $R4/f2$ is beyond the lower limit of the conditional expression (7), the paraxial curvature radius of the surface on the object side of the second lens becomes excessively small. Thus, the refractive power of the second lens becomes large, which consequently lowers manufacturing efficiency of the second lens.

On the other hand, if $R4/f2$ is beyond the upper limit of the conditional expression (7), the paraxial curvature radius of the surface on the object side of the second lens becomes excessively large, ghosting light generated in the peripheral portion of the lens enters the imaging device such as a CCD or CMOS, which causes deterioration of image quality.

[Value Examples of Imaging Lens]

Hereinafter, specific embodiments of the imaging device of the present disclosure and value examples obtained by applying specific values to the embodiments will be described with reference to the accompanying drawings and tables.

Meanings or the like of symbols shown in the following tables and description are as follows.

A "surface number Si" is the i-th surface counted from the object side to the image side; a "paraxial curvature radius Ri" is the paraxial curvature radius of the i-th surface; an "interval Di" is the axial surface interval (the center thickness of the lens or air interval) between the i-th surface and an (i+1)-th surface; a "refractive index Ndi" is the refractive index in d-line (λ=587.6 nm) of a lens or the like starting from the i-th surface; and a "vdi" is the Abbe number in d-line of the lens starting from the i-th surface.

An "STO" represents the aperture stop with respect to the "surface number Si", and "∞" represents a flat surface with respect to the "paraxial curvature radius Ri".

"K" represents a conic constant, and "3rd" "4th", . . . represent third, fourth, . . . astigmatism coefficients, respectively.

In each table indicating the following astigmatism coefficients, "E-n" represents an exponential expression using "10" as the base, that is, "10$^{-n}$". For example, "0.12345E-05" represents "0.12345×10$^{-5}$".

As the imaging lens used in each embodiment, there is an imaging lens in which a surface of a lens is formed in an aspherical shape. When the depth of the aspherical surface is "Z", the height from the optical axis is "Y", the paraxial curvature radius is "R", the conic constant is "K", and the i-th aspherical coefficient ("i" is an integer of 3 or more) is "Ai", the shape of the aspherical surface is defined by the following expression (1).

$$Z = \frac{Y^2/R}{1+\sqrt{1-(1+K)(Y/R)^2}} + \sum Ai \cdot Y^i \quad (1)$$

First Embodiment

FIG. 1 is a diagram illustrating a lens configuration of an imaging lens 1 according to a first embodiment.

The imaging lens 1 includes an aperture stop STO, a first lens G1 having a positive refractive power, a second lens G2 having a negative refractive power, a third lens G3 having a positive refractive power, and a fourth lens G4 having a negative refractive power, which are sequentially disposed from the object side to the image side.

The first lens G1 is formed in a convex shape on both sides thereof.

The second lens G2 is formed in a concave shape on both sides thereof, and the absolute value of the paraxial curvature radius of the surface thereof on the image side is smaller than the absolute value of the paraxial curvature radius of the surface thereof on the object side.

The third lens G3 is formed in a meniscus shape in which a concave surface is directed toward the object side.

The fourth lens G4 is formed in a shape in which the surface in the proximity of the optical axis forms a convex surface toward the object side, and has an inflection point in the effective diameter of the surface on the object side and in the effective diameter of the surface on the image side, respectively.

A seal glass SG is disposed between the fourth lens G4 and an image surface IMG.

Lens data of a first value example obtained by applying specific values to the imaging lens 1 according to the first embodiment is shown together with an F-number "FNo", the focal length "f" of an entire lens system and a field angle "2ω", in Table 1.

TABLE 1

FNo = 2.4
f = 3.7
2ω = 76.5° first value example lens data

| Si surface number | Ri curvature radius | Di interval | Ndi refractive index | vdi Abbe number |
|---|---|---|---|---|
| 1 (STO) | ∞ | −0.120 | — | — |
| 2 | 1.738 | 0.681 | 1.535 | 56.3 |
| 3 | −5.719 | 0.030 | — | — |
| 4 | −48.136 | 0.380 | 1.636 | 23.9 |
| 5 | 2.918 | 0.603 | — | — |
| 6 | −4.118 | 0.821 | 1.535 | 56.3 |
| 7 | −2.538 | 0.335 | — | — |
| 8 | 1.097 | 0.550 | 1.535 | 56.3 |
| 9 | 0.775 | 0.400 | — | — |
| 10 | ∞ | 0.100 | 1.518 | 64.1 |
| 11 | ∞ | 0.700 | — | — |

In the imaging lens 1, both surfaces (the second surface and the third surface) of the first lens G1, both surfaces (the fourth surface and the fifth surface) of the second lens G2, both surfaces (the sixth surface and the seventh surface) of the third lens G3, and both surfaces (the eighth surface and the ninth surface) of the fourth lens G4 are formed as aspherical surfaces. The aspherical coefficients of the aspherical surfaces in the first value example are shown together with the conic constants K, in Table 2.

TABLE 2 first value example aspherical data

| Si surface number | K conic constant | 3rd | 4th | 5th | 6th | 7th |
|---|---|---|---|---|---|---|
| 1 (STO) | — | — | — | — | — | — |
| 2 | −1.115E+01 | | 2.378E−01 | | −3.132E−01 | |
| 3 | 9.485E+00 | | 3.390E−02 | | −9.751E−02 | |
| 4 | 0.000E+00 | −2.816E−03 | 5.022E−02 | −1.149E−02 | −6.019E−02 | −2.337E−02 |
| 5 | 1.361E+00 | 6.094E−03 | 1.937E−02 | 1.909E−02 | −1.624E−02 | −3.466E−03 |
| 6 | 1.434E+00 | −2.493E−02 | 1.145E−01 | −1.869E−01 | 2.919E−02 | 1.086E−02 |
| 7 | 1.835E+00 | −1.569E−01 | −4.627E−02 | 2.119E−01 | −1.350E−01 | 2.303E−02 |
| 8 | −4.649E+00 | −1.683E−01 | −1.929E−01 | 1.068E−01 | 7.347E−03 | 7.705E−03 |
| 9 | −3.477E+00 | −4.972E−02 | −1.923E−01 | 1.645E−01 | −4.000E−02 | −5.309E−03 |

| Si surface number | 8th | 9th | 10th | 11th |
|---|---|---|---|---|
| 1 (STO) | — | — | — | — |

TABLE 2-continued

| | first value example aspherical data | | | |
|---|---|---|---|---|
| 2 | 3.120E−01 | | −1.702E−01 | — |
| 3 | 1.224E−01 | | −5.357E−02 | — |
| 4 | 1.338E−01 | 4.543E−02 | −6.858E−02 | — |
| 5 | 3.687E−02 | −2.734E−02 | 3.256E−02 | — |
| 6 | 3.023E−02 | −6.883E−03 | −1.000E−02 | — |
| 7 | −2.058E−02 | 1.656E−02 | 8.371E−03 | −2.697E−03 |
| 8 | −3.536E−03 | −2.565E−03 | 5.761E−05 | 2.818E−04 |
| 9 | 1.561E−03 | 1.014E−03 | −2.724E−04 | — |

Figure 2:
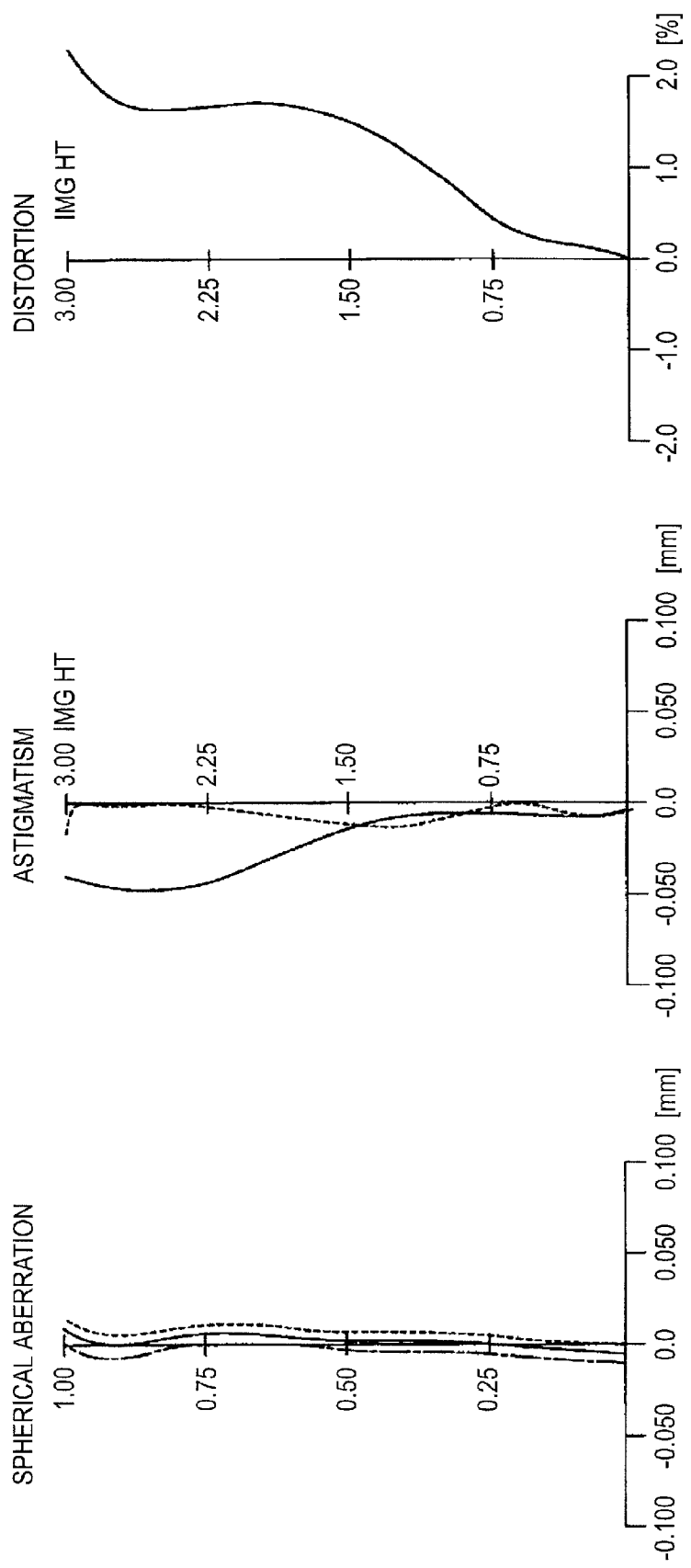
FIG. 2 is a diagram illustrating spherical aberration, astigmatism and distortion of a value example obtained by applying specific values to the first embodiment.

FIG. 2 is a diagram illustrating spherical aberration, astigmatism and distortion in the first value example.

In FIG. 2, in the spherical aberration figure, the value of g-line (a wavelength of 435.8400 nm) is indicated by a two-dot chain line, the value of d-line (a wavelength of 587.5600 nm) is indicated by a solid line, and the value of c-line (a wavelength of 656.2700 nm) is indicated by a dotted line, respectively. In the astigmatism figure, the value on a sagittal image surface is indicated by a solid line, and the value on a meridional image surface is indicated by a dotted line.

It is obvious from each aberration figure that in the first value example, various aberrations are reliably corrected and an excellent imaging performance is achieved.

Second Embodiment

Figure 3:
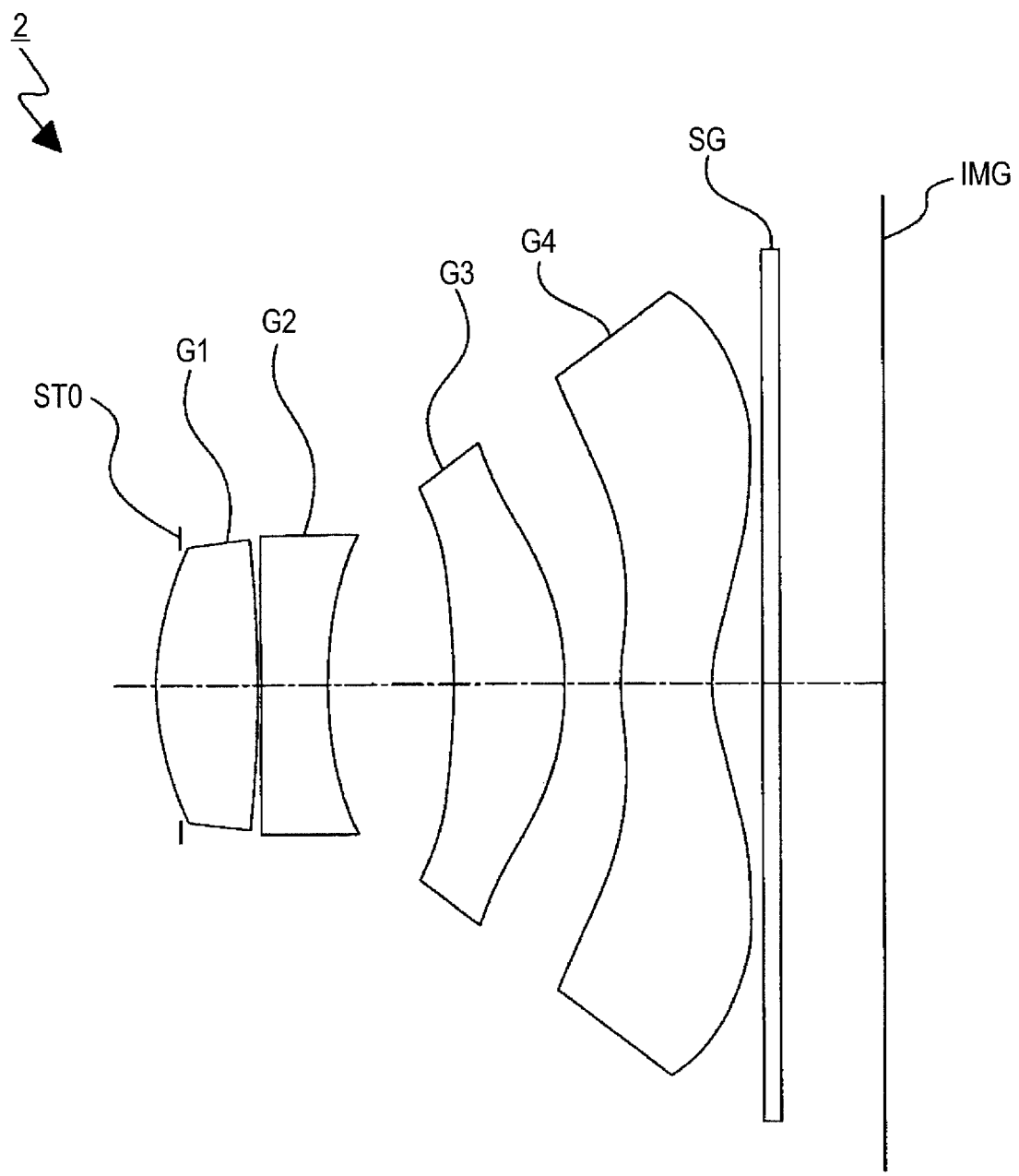
FIG. 3 is a diagram illustrating a lens configuration of an imaging lens according to a second embodiment.

FIG. 3 is a diagram illustrating a lens configuration of an imaging lens 2 according to a second embodiment.

The imaging lens 2 includes an aperture stop STO, a first lens G1 having a positive refractive power, a second lens G2 having a negative refractive power, a third lens G3 having a positive refractive power, and a fourth lens G4 having a negative refractive power, which are sequentially disposed from the object side to the image side.

The first lens G1 is formed in a convex shape on both sides thereof.

The second lens G2 is formed in a concave shape on both sides thereof, and the absolute value of the paraxial curvature radius of the surface thereof on the image side is smaller than the absolute value of the paraxial curvature radius of the surface thereof on the object side.

The third lens G3 is formed in a meniscus shape in which a concave surface is directed toward the object side.

The fourth lens G4 is formed in a shape in which a surface in the proximity of the optical axis forms a convex surface toward the object side, and has an inflection point in the effective diameter of the surface on the object side and in the effective diameter of the surface on the image side, respectively.

A seal glass SG is disposed between the fourth lens G4 and an image surface IMG.

Lens data of a second value example obtained by applying specific values to the imaging lens 2 according to the second embodiment is shown together with an F-number "FNo", the focal length "f" of an entire lens system and a field angle "2ω", in Table 3.

TABLE 3

FNo = 2.4
f = 3.2
2ω = 71.0°
second value example lens data

| Si surface number | Ri curvature radius | Di interval | Ndi refractive index | vdi Abbe number |
|---|---|---|---|---|
| 1 (STO) | ∞ | −0.123 | — | — |
| 2 | 1.322 | 0.511 | 1.535 | 56.3 |
| 3 | −6.693 | 0.023 | — | — |
| 4 | −29.992 | 0.341 | 1.636 | 23.9 |
| 5 | 2.571 | 0.641 | — | — |
| 6 | −3.705 | 0.556 | 1.535 | 56.3 |
| 7 | −1.850 | 0.278 | — | — |
| 8 | 1.346 | 0.462 | 1.535 | 56.3 |
| 9 | 0.765 | 0.270 | — | — |
| 10 | ∞ | 0.080 | 1.518 | 64.1 |
| 11 | ∞ | 0.539 | — | — |

In the imaging lens 2, both surfaces (the second surface and the third surface) of the first lens G1, both surfaces (the fourth surface and the fifth surface) of the second lens G2, both surfaces (the sixth surface and the seventh surface) of the third lens G3, and both surfaces (the eighth surface and the ninth surface) of the fourth lens G4 are formed as aspherical surfaces. The aspherical coefficients of the aspherical surfaces in the second value example are shown together with the conic constants K, in Table 4.

TABLE 4

| | | second value example aspherical data | | | | |
|---|---|---|---|---|---|---|
| Si surface number | K cone constant | 3rd | 4th | 5th | 6th | 7th |
| 1 (STO) | — | — | — | — | — | — |
| 2 | −1.115E+01 | | 5.426E−01 | | −1.096E+00 | |
| 3 | 9.485E+00 | | 8.200E−02 | | −3.761E−01 | |
| 4 | 0.000E+00 | 2.129E−02 | 5.817E−02 | 5.226E−02 | −1.691E−01 | −1.816E−01 |
| 5 | 1.361E+00 | −6.647E−03 | 1.124E−01 | 6.251E−02 | −6.470E−02 | −4.313E−02 |
| 6 | 1.831E+00 | −4.246E−02 | 1.191E−01 | −2.706E−01 | 1.717E−01 | −7.020E−02 |

TABLE 4-continued

| | | second value example aspherical data | | | | |
|---|---|---|---|---|---|---|
| 7 | −4.566E−01 | −2.004E−01 | −8.389E−02 | 4.840E−01 | −4.936E−01 | 1.865E−01 |
| 8 | −1.000E+01 | −2.014E−01 | −4.445E−01 | 3.091E−01 | 3.312E−02 | 3.577E−02 |
| 9 | −3.842E+00 | −1.022E−01 | −3.440E−01 | 4.261E−01 | −1.541E−01 | −2.423E−02 |

| Si surface number | 8th | 9th | 10th | 11th |
|---|---|---|---|---|
| 1 (STO) | — | — | — | — |
| 2 | 1.636E+00 | | −1.218E+00 | — |
| 3 | 8.235E−01 | | −6.552E−01 | — |
| 4 | 6.407E−01 | 2.151E−01 | −4.579E−01 | — |
| 5 | 1.921E−01 | −2.616E−01 | 3.974E−01 | — |
| 6 | 1.011E−01 | 3.916E−04 | −4.926E−02 | — |
| 7 | −6.871E−02 | 1.367E−01 | 4.986E−02 | −8.258E−02 |
| 8 | −2.443E−02 | −2.325E−02 | −3.249E−04 | 5.033E−03 |
| 9 | 1.376E−02 | 9.329E−03 | −3.882E−03 | — |

Figure 4:
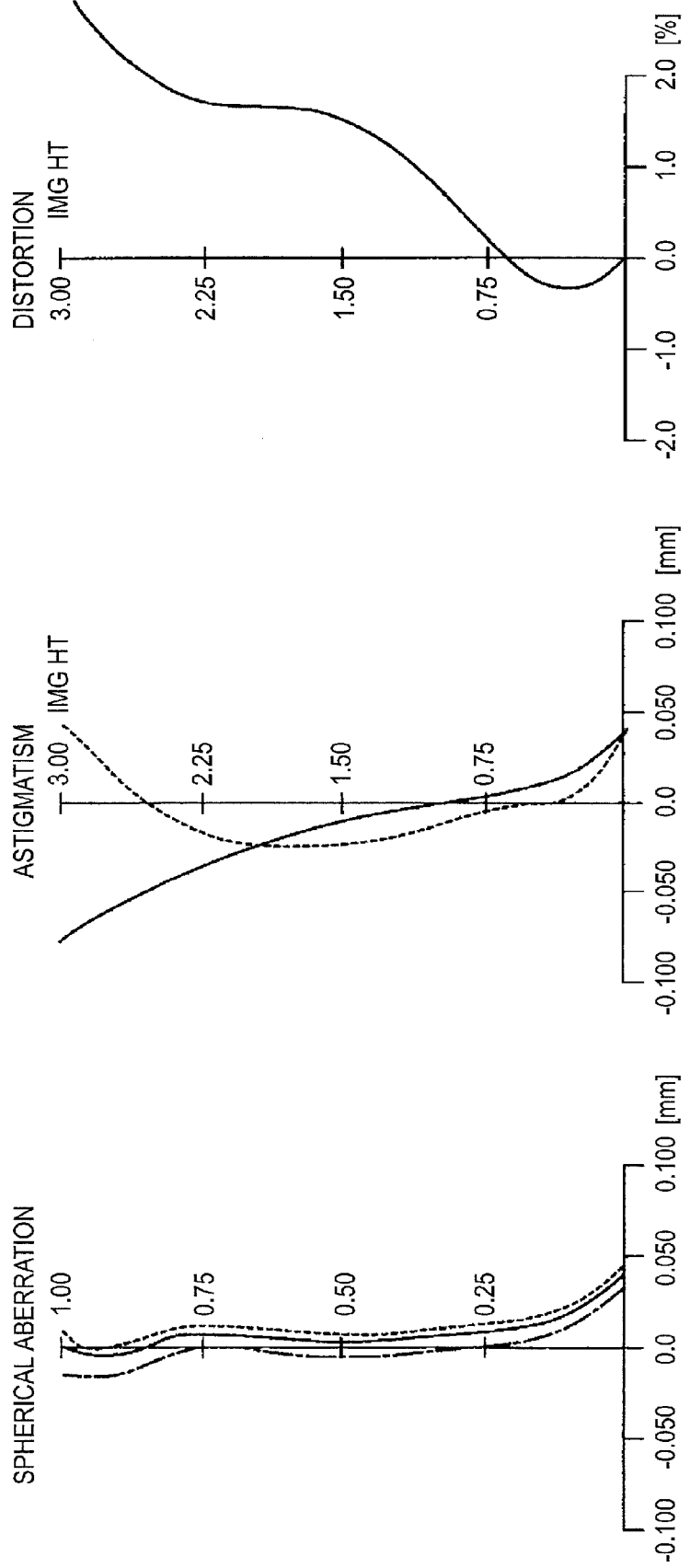
FIG. 4 is a diagram illustrating spherical aberration, astigmatism and distortion of a value example obtained by applying specific values to the second embodiment.

FIG. 4 is a diagram illustrating spherical aberration, astigmatism and distortion of the second value example.

In FIG. 4, in the spherical aberration figure, the value of g-line (a wavelength of 435.8400 nm) is indicated by a two-dot chain line, the value of d-line (a wavelength of 587.5600 nm) is indicated by a solid line, and the value of c-line (a wavelength of 656.2700 nm) is indicated by a dotted line, respectively. In the astigmatism figure, the value on a sagittal image surface is indicated by a solid line, and the value on a meridional image surface is indicated by a dotted line.

It is obvious from each aberration figure that in the second value example, various aberrations are reliably corrected and an excellent imaging performance is achieved.

Third Embodiment

Figure 5:
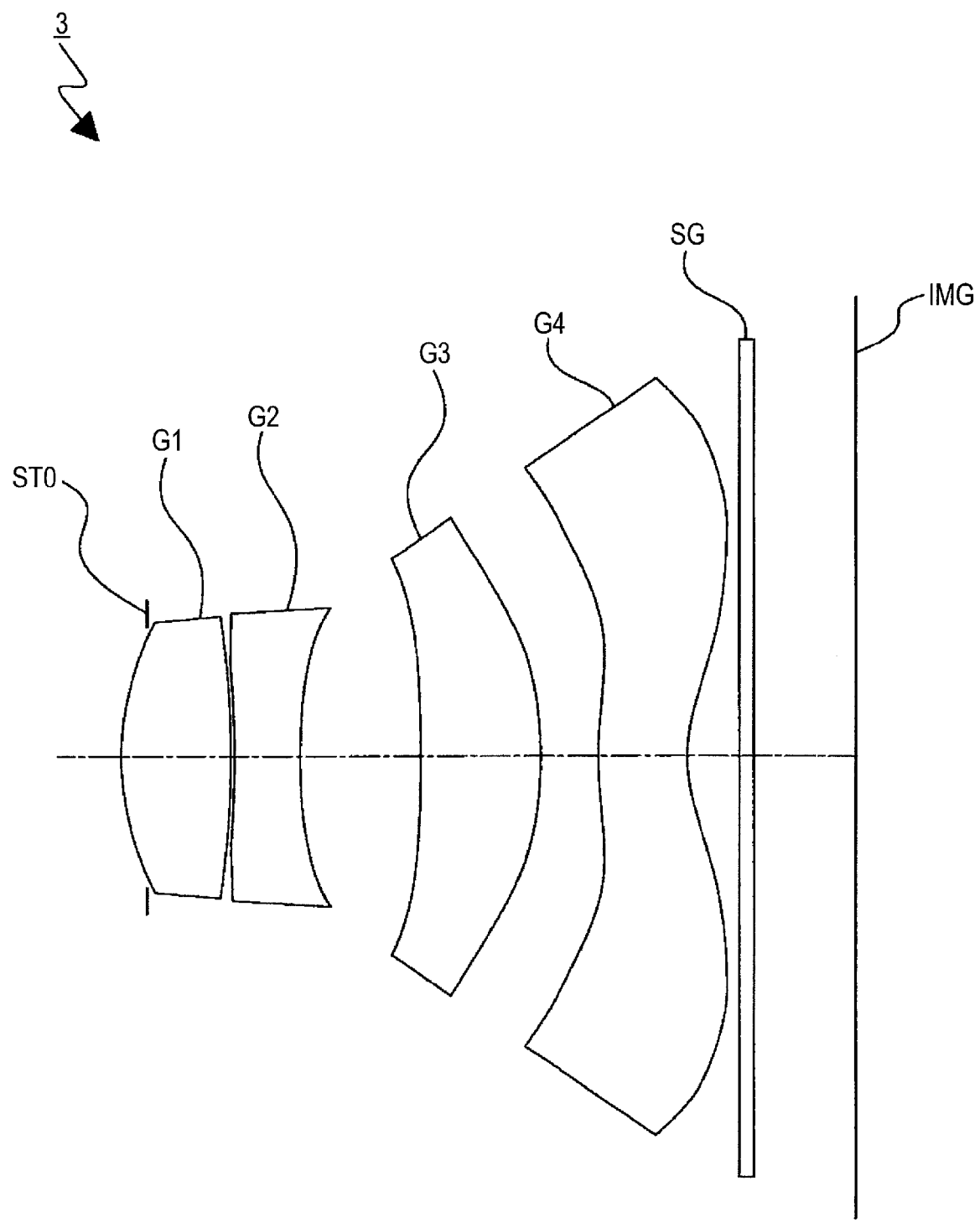
FIG. 5 is a diagram illustrating a lens configuration of an imaging lens according to a third embodiment.

FIG. 5 is a diagram illustrating a lens configuration of an imaging lens 3 according to a third embodiment.

The imaging lens 3 includes an aperture stop STO, a first lens G1 having a positive refractive power, a second lens G2 having a negative refractive power, a third lens G3 having a positive refractive power, and a fourth lens G4 having a negative refractive power, which are sequentially disposed from the object side to the image side.

The first lens G1 is formed in a convex shape on both sides thereof.

The second lens G2 is formed in a concave shape on both sides thereof, and the absolute value of the paraxial curvature radius of the surface thereof on the image side is smaller than the absolute value of the paraxial curvature radius of the surface thereof on the object side.

The third lens G3 is formed in a meniscus shape in which a concave surface is directed toward the object side.

The fourth lens G4 is formed in a shape in which a surface in the proximity of the optical axis forms a convex surface toward the object side, and has an inflection point in the effective diameter of the surface on the object side and in the effective diameter of the surface on the image side, respectively.

A seal glass SG is disposed between the fourth lens G4 and an image surface IMG.

Lens data of a third value example obtained by applying specific values to the imaging lens 3 according to the third embodiment is shown together with an F-number "FNo", the focal length "f" of an entire lens system and a field angle "2ω", in Table 5.

TABLE 5

FNo = 2.4
f = 4.2
2ω = 70.2° third value example lens data

| Si surface number | Ri curvature radius | Di interval | Ndi refractive index | νdi Abbe number |
|---|---|---|---|---|
| 1 (STO) | ∞ | −0.160 | — | — |
| 2 | 1.777 | 0.725 | 1.535 | 56.3 |
| 3 | −6.137 | 0.030 | — | — |
| 4 | −11.010 | 0.441 | 1.615 | 25.6 |
| 5 | 3.530 | 0.809 | — | — |
| 6 | −9.163 | 0.816 | 1.535 | 56.3 |
| 7 | −3.105 | 0.380 | — | — |
| 8 | 1.647 | 0.600 | 1.535 | 56.3 |
| 9 | 0.973 | 0.350 | — | — |
| 10 | ∞ | 0.100 | 1.518 | 64.1 |
| 11 | ∞ | 0.700 | — | — |

In the imaging lens 3, both surfaces (the second surface and the third surface) of the first lens G1, both surfaces (the fourth surface and the fifth surface) of the second lens G2, both surfaces (the sixth surface and the seventh surface) of the third lens G3, and both surfaces (the eighth surface and the ninth surface) of the fourth lens G4 are formed as aspherical surfaces. The aspherical coefficients of the aspherical surfaces in the third value example are shown together with the conic constants K, in Table 6.

TABLE 6 third value example aspherical data

| Si surface number | K conic constant | 3rd | 4th | 5th | 6th | 7th |
|---|---|---|---|---|---|---|
| 1 (STO) | — | — | — | — | — | — |
| 2 | −1.115E+01 | | 2.309E−01 | | −2.633E−01 | |
| 3 | 9.485E+00 | | 3.906E−02 | | −7.868E−02 | |
| 4 | 0.000E+00 | 3.629E−03 | 3.439E−02 | 1.046E−02 | −4.142E−02 | −3.146E−02 |
| 5 | 1.361E+00 | 6.890E−03 | 1.568E−02 | 3.378E−02 | −7.647E−03 | −8.219E−03 |
| 6 | −1.000E+01 | −4.392E−02 | 9.124E−02 | −1.179E−01 | 3.034E−02 | −1.537E−02 |
| 7 | 7.483E−01 | −1.126E−01 | −5.584E−02 | 1.787E−01 | −1.329E−01 | 3.583E−02 |
| 8 | −9.071E+00 | −1.162E−01 | −2.149E−01 | 1.032E−01 | 1.157E−02 | 8.658E−03 |
| 9 | −4.642E+00 | −1.696E−02 | −1.788E−01 | 1.340E−01 | −2.668E−02 | −5.580E−03 |

| Si surface number | 8th | 9th | 10th | 11th |
|---|---|---|---|---|
| 1 (STO) | — | — | — | — |
| 2 | 2.248E−01 | | −9.489E−02 | — |
| 3 | 1.038E−01 | | −4.861E−02 | — |
| 4 | 1.007E−01 | 1.678E−02 | −4.244E−02 | — |
| 5 | 3.062E−02 | −3.204E−02 | 2.568E−02 | — |
| 6 | 2.354E−02 | 4.663E−03 | −9.248E−03 | — |
| 7 | −1.498E−02 | 1.454E−02 | 4.639E−03 | −4.601E−03 |
| 8 | −4.052E−03 | −2.959E−03 | −1.165E−04 | 3.808E−04 |
| 9 | 9.793E−04 | 8.917E−04 | −2.261E−04 | — |

Figure 6:
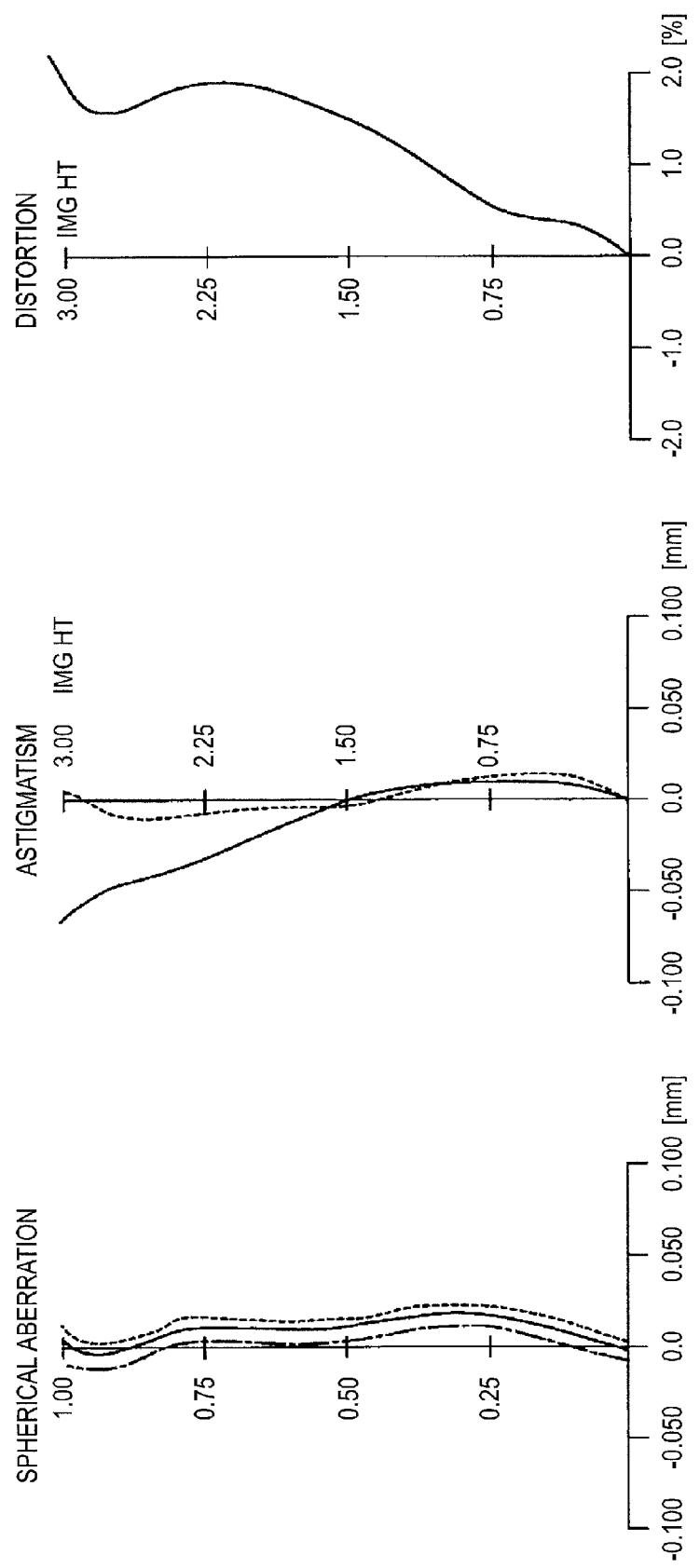
FIG. 6 is a diagram illustrating spherical aberration, astigmatism and distortion of a value example obtained by applying specific values to the third embodiment.

FIG. 6 is a diagram illustrating spherical aberration, astigmatism and distortion of the third value example.

In FIG. 6, in the spherical aberration figure, the value of g-line (a wavelength of 435.8400 nm) is indicated by a two-dot chain line, the value of d-line (a wavelength of 587.5600 nm) is indicated by a solid line, and the value of c-line (a wavelength of 656.2700 nm) is indicated by a dotted line, respectively. In the astigmatism figure, the value on a sagittal image surface is indicated by a solid line, and the value on a meridional image surface is indicated by a dotted line.

It is obvious from each aberration figure that in the third value example, various aberrations are reliably corrected and an excellent imaging performance is achieved.

Fourth Embodiment

Figure 7:
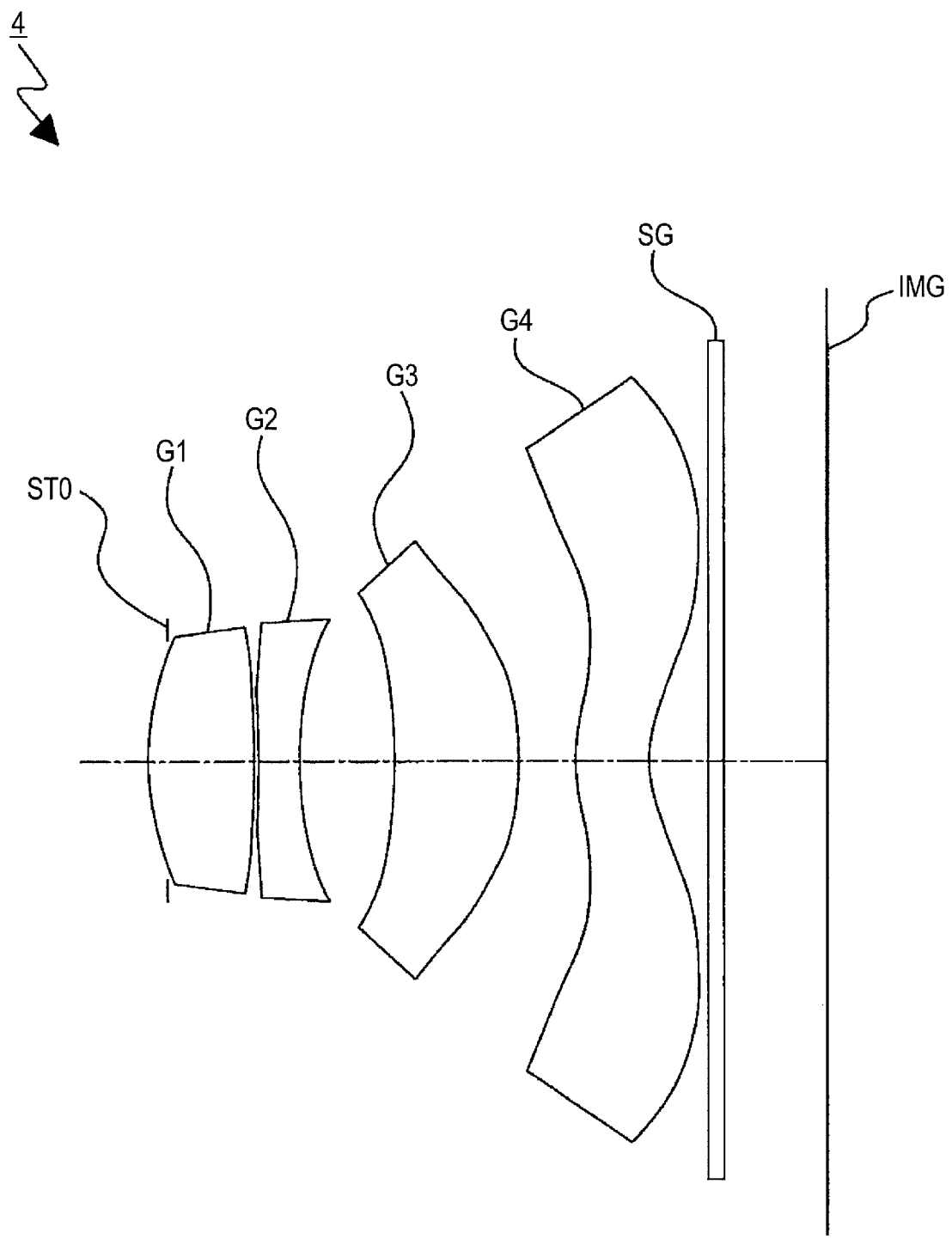
FIG. 7 is a diagram illustrating a lens configuration of an imaging lens according to a fourth embodiment.

FIG. 7 is a diagram illustrating a lens configuration of an imaging lens 4 according to a fourth embodiment.

The imaging lens 4 includes an aperture stop STO, a first lens G1 having a positive refractive power, a second lens G2 having a negative refractive power, a third lens G3 having a positive refractive power, and a fourth lens G4 having a negative refractive power, which are sequentially disposed from the object side to the image side.

The first lens G1 is formed in a convex shape on both sides thereof.

The second lens G2 is formed in a concave shape on both sides thereof, and the absolute value of the paraxial curvature radius of the surface thereof on the image side is smaller than the absolute value of the paraxial curvature radius of the surface thereof on the object side.

The third lens G3 is formed in a meniscus shape in which a concave surface is directed toward the object side.

The fourth lens G4 is formed in a shape in which a surface in the proximity of the optical axis forms a convex surface toward the object side, and has an inflection point in the effective diameter of the surface on the object side and in the effective diameter of the surface on the image side, respectively.

A seal glass SG is disposed between the fourth lens G4 and an image surface IMG.

Lens data of a fourth value example obtained by applying specific values to the imaging lens 4 according to the fourth embodiment is shown together with an F-number "FNo", the focal length "f" of an entire lens system and a field angle "2ω", in Table 7.

TABLE 7

FNo = 2.4
f = 2.9
2ω = 77.0°
fourth value example lens data

| Si surface number | Ri curvature radius | Di interval | Ndi refractive index | vdi Abbe number |
|---|---|---|---|---|
| 1 (STO) | ∞ | −0.092 | — | — |
| 2 | 1.337 | 0.556 | 1.535 | 56.3 |
| 3 | −4.262 | 0.023 | — | — |
| 4 | −80.668 | 0.216 | 1.636 | 23.9 |
| 5 | 2.167 | 0.491 | — | — |
| 6 | −3.254 | 0.649 | 1.535 | 56.3 |
| 7 | −1.939 | 0.308 | — | — |
| 8 | 0.763 | 0.377 | 1.535 | 56.3 |
| 9 | 0.545 | 0.308 | — | — |
| 10 | ∞ | 0.080 | 1.518 | 64.1 |
| 11 | ∞ | 0.539 | — | — |

In the imaging lens 4, both surfaces (the second surface and the third surface) of the first lens G1, both surfaces (the fourth surface and the fifth surface) of the second lens G2, both surfaces (the sixth surface and the seventh surface) of the third lens G3, and both surfaces (the eighth surface and the ninth surface) of the fourth lens G4 are formed as aspherical surfaces. The aspherical coefficients of the aspherical surfaces in the fourth value example are shown together with the conic constants K, in Table 8.

TABLE 8 fourth value example aspherical data

| Si surface number | K conic constant | 3rd | 4th | 5th | 6th | 7th |
|---|---|---|---|---|---|---|
| 1 (STO) | — | — | — | — | — | — |
| 2 | -1.115E+01 | | 5.273E-01 | | -1.160E+00 | |
| 3 | 9.485E+00 | | 7.932E-02 | | -3.465E-01 | |
| 4 | 0.000E+00 | -9.401E-03 | 1.205E-01 | -3.564E-02 | -2.177E-01 | -9.121E-02 |
| 5 | 1.361E+00 | 4.325E-03 | 3.427E-02 | 6.497E-02 | -4.228E-02 | -1.609E-04 |
| 6 | -5.815E-01 | -8.867E-02 | 2.641E-01 | -5.400E-01 | 9.527E-02 | 3.492E-02 |
| 7 | 1.844E+00 | -2.838E-01 | -8.693E-02 | 6.129E-01 | -5.080E-01 | 9.356E-02 |
| 8 | -4.605E+00 | -2.722E-01 | -4.325E-01 | 3.047E-01 | 2.754E-02 | 3.756E-02 |
| 9 | -3.296E+00 | -1.153E-01 | -4.062E-01 | 4.808E-01 | -1.591E-01 | -2.351E-02 |

| Si surface number | 8th | 9th | 10th | 11th |
|---|---|---|---|---|
| 1 (STO) | — | — | — | — |
| 2 | 1.935E+00 | | -1.748E+00 | — |
| 3 | 7.330E-01 | | -5.566E-01 | — |
| 4 | 8.619E-01 | 3.705E-01 | -8.008E-01 | — |
| 5 | 2.358E-01 | -2.211E-01 | 3.364E-01 | — |
| 6 | 1.688E-01 | -5.772E-02 | -4.803E-02 | — |
| 7 | -1.385E-01 | 1.323E-01 | 9.312E-02 | -2.875E-02 |
| 8 | -2.170E-02 | -2.085E-02 | 6.204E-04 | 3.655E-03 |
| 9 | 1.046E-02 | 8.188E-03 | -2.923E-03 | — |

Figure 8:
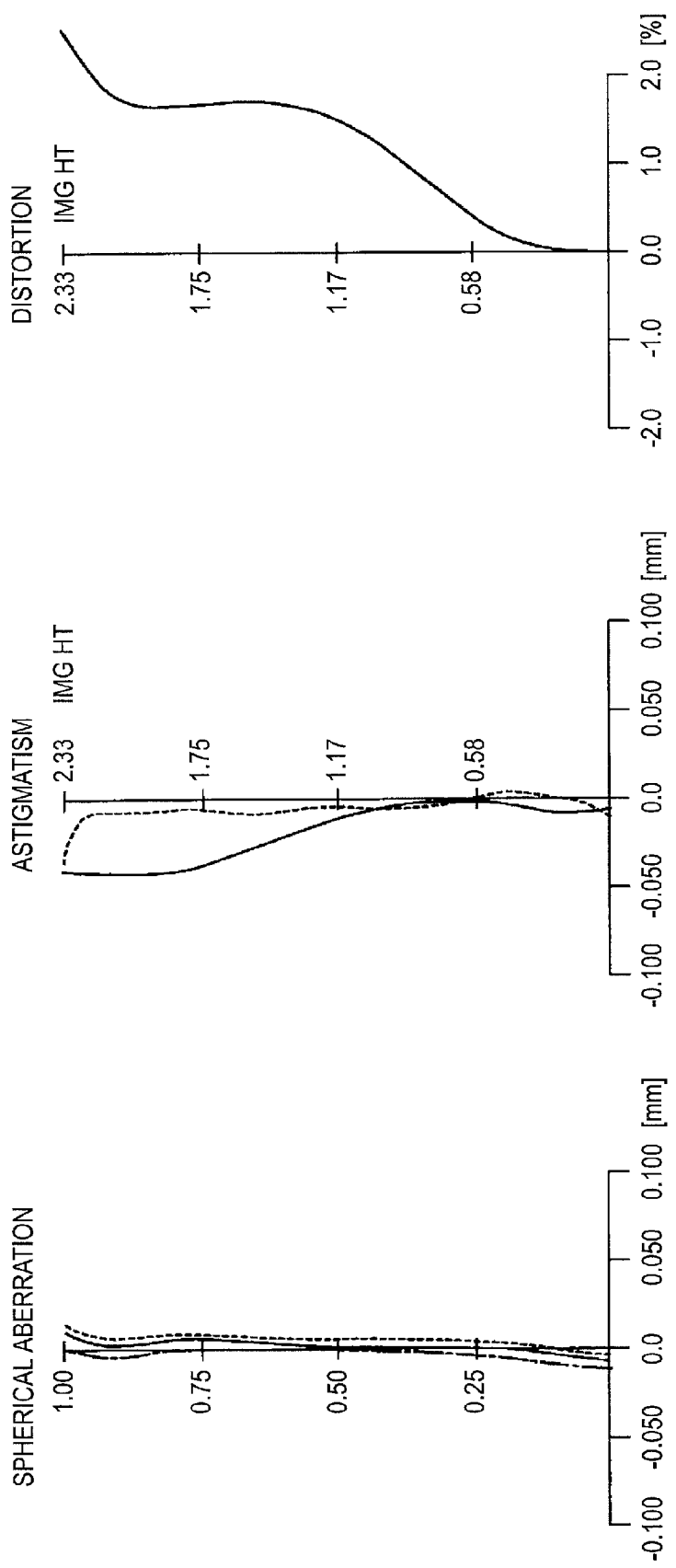
FIG. 8 is a diagram illustrating spherical aberration, astigmatism and distortion of a value example obtained by applying specific values to the fourth embodiment.

FIG. 8 is a diagram illustrating spherical aberration, astigmatism and distortion of the fourth value example.

In FIG. 8, in the spherical aberration figure, the value of g-line (a wavelength of 435.8400 nm) is indicated by a two-dot chain line, the value of d-line (a wavelength of 587.5600 nm) is indicated by a solid line, and the value of c-line (a wavelength of 656.2700 nm) is indicated by a dotted line, respectively. In the astigmatism figure, the value on a sagittal image surface is indicated by a solid line, and the value on a meridional image surface is indicated by a dotted line.

It is obvious from each aberration figure that in the fourth value example, various aberrations are reliably corrected and an excellent imaging performance is achieved.

Fifth Embodiment

Figure 9:
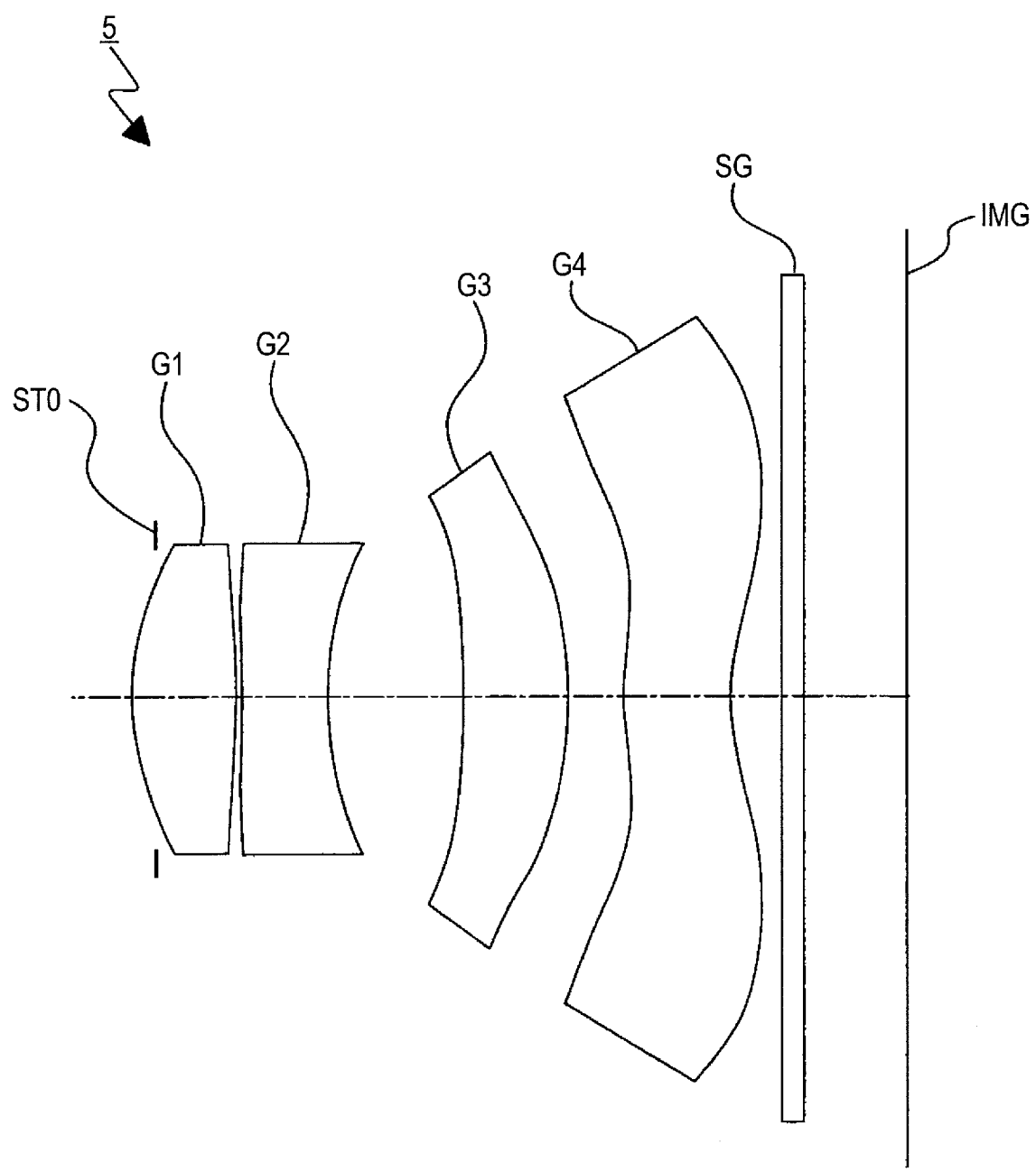
FIG. 9 is a diagram illustrating a lens configuration of an imaging lens according to a fifth embodiment.

FIG. 9 is a diagram illustrating a lens configuration of an imaging lens 5 according to a fifth embodiment.

The imaging lens 5 includes an aperture stop STO, a first lens G1 having a positive refractive power, a second lens G2 having a negative refractive power, a third lens G3 having a positive refractive power, and a fourth lens G4 having a negative refractive power, which are sequentially disposed from the object side to the image side.

The first lens G1 is formed in a convex shape on both sides thereof.

The second lens G2 is formed in a concave shape on both sides thereof, and the absolute value of the paraxial curvature radius of the surface thereof on the image side is smaller than the absolute value of the paraxial curvature radius of the surface thereof on the object side.

The third lens G3 is formed in a meniscus shape in which a concave surface is directed toward the object side.

The fourth lens G4 is formed in a shape in which a surface in the proximity of the optical axis forms a convex surface toward the object side, and has an inflection point in the effective diameter of the surface on the object side and in the effective diameter of the surface on the image side, respectively.

A seal glass SG is disposed between the fourth lens G4 and an image surface IMG.

Lens data of a fifth value example obtained by applying specific values to the imaging lens 5 according to the fifth embodiment is shown together with an F-number "FNo", the focal length "f" of an entire lens system and a field angle "2ω", in Table 9.

TABLE 9

FNo = 2.4
f = 4.7
2ω = 64.2°
fifth value example lens data

| Si surface number | Ri curvature radius | Di interval | Ndi refractive index | νdi Abbe number |
|---|---|---|---|---|
| 1 (STO) | ∞ | -0.160 | — | — |
| 2 | 1.756 | 0.684 | 1.535 | 56.3 |
| 3 | -8.355 | 0.030 | — | — |
| 4 | -29.693 | 0.600 | 1.615 | 25.6 |
| 5 | 2.966 | 0.906 | — | — |
| 6 | -11.240 | 0.700 | 1.535 | 56.3 |
| 7 | -5.446 | 0.380 | — | — |
| 8 | 1.886 | 0.700 | 1.535 | 56.3 |
| 9 | 1.186 | 0.350 | — | — |
| 10 | ∞ | 0.150 | 1.518 | 64.1 |
| 11 | ∞ | 0.700 | — | — |

In the imaging lens 5, both surfaces (the second surface and the third surface) of the first lens G1, both surfaces (the fourth surface and the fifth surface) of the second lens G2, both surfaces (the sixth surface and the seventh surface) of the third lens G3, and both surfaces (the eighth surface and the ninth surface) of the fourth lens G4 are formed as aspherical surfaces. The aspherical coefficients of the aspherical surfaces in the fifth value example are shown together with the conic constants K, in Table 10.

TABLE 10 fifth value example aspherical data

| Si surface number | K conic constant | 3rd | 4th | 5th | 6th | 7th |
|---|---|---|---|---|---|---|
| 1 (STO) | — | — | — | — | — | — |
| 2 | −1.115E+01 | | 2.318E−01 | | −2.375E−01 | |
| 3 | 9.485E+00 | | 4.758E−02 | | −9.778E−02 | |
| 4 | 0.000E+00 | 1.825E−02 | 3.118E−03 | 1.953E−02 | −2.877E−02 | −3.460E−02 |
| 5 | 1.361E+00 | −2.591E−03 | 3.238E−02 | 9.826E−03 | −1.849E−02 | 1.309E−04 |
| 6 | −1.000E+01 | −5.738E−02 | 8.443E−02 | −9.995E−02 | 2.657E−02 | −2.191E−02 |
| 7 | 3.476E+00 | −1.160E−01 | −8.518E−02 | 1.814E−01 | −1.251E−01 | 3.679E−02 |
| 8 | −1.000E+01 | −9.053E−02 | −2.162E−01 | 9.705E−02 | 9.648E−03 | 9.482E−03 |
| 9 | −4.039E+00 | −4.750E−02 | −1.710E−01 | 1.408E−01 | −3.126E−02 | −5.230E−03 |

| Si surface number | 8th | 9th | 10th | 11th |
|---|---|---|---|---|
| 1 (STO) | — | — | — | — |
| 2 | 1.766E−01 | | −6.226E−02 | — |
| 3 | 1.183E−01 | | −5.210E−02 | — |
| 4 | 8.693E−02 | 7.622E−03 | −3.250E−02 | — |
| 5 | 4.247E−02 | −2.907E−02 | 1.739E−02 | — |
| 6 | 2.062E−02 | 4.922E−03 | −7.370E−03 | — |
| 7 | −1.653E−02 | 1.332E−02 | 4.474E−03 | −4.148E−03 |
| 8 | −3.265E−03 | −2.628E−03 | −7.526E−05 | 2.870E−04 |
| 9 | 1.095E−03 | 9.871E−04 | −2.382E−04 | — |

Figure 10:
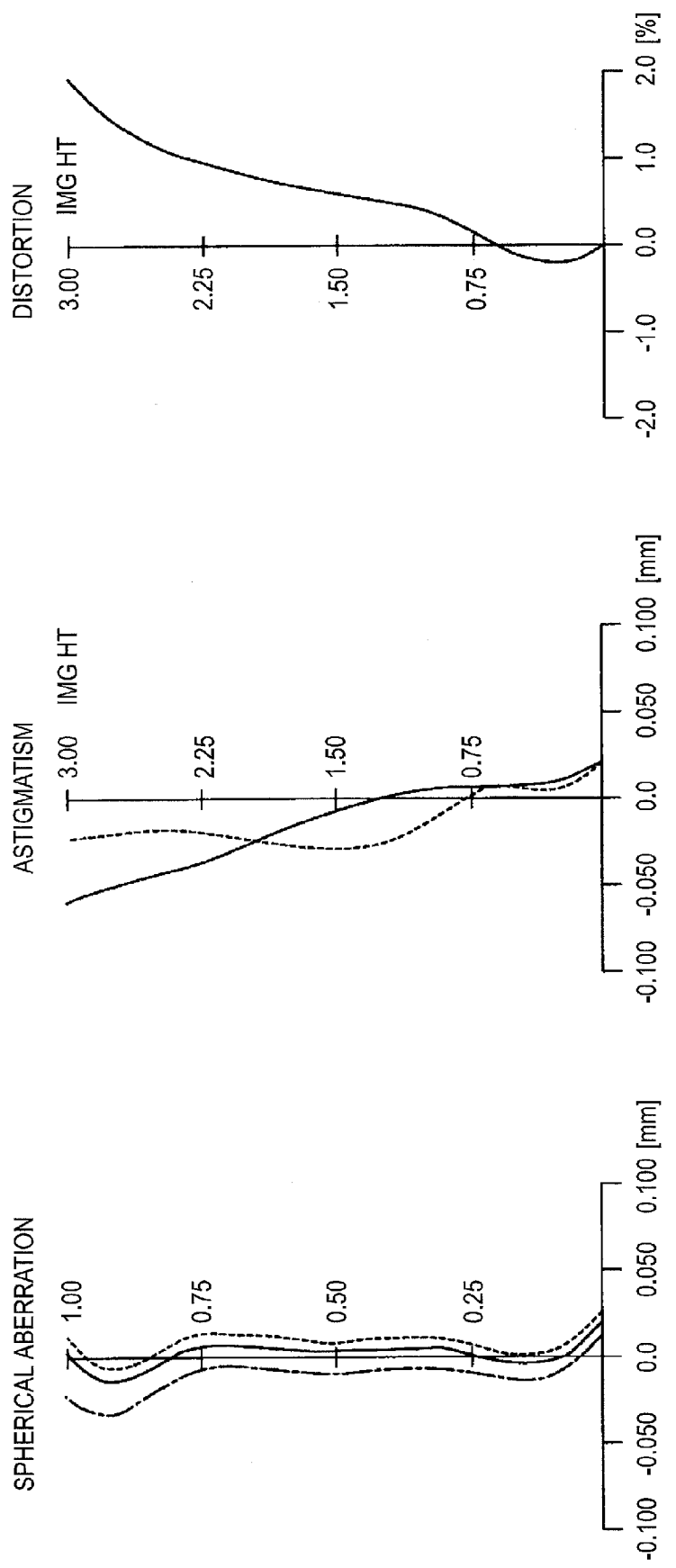
FIG. 10 is a diagram illustrating spherical aberration, astigmatism and distortion of a value example obtained by applying specific values to the fifth embodiment.

FIG. 10 is a diagram illustrating spherical aberration, astigmatism and distortion of the fifth value example.

In FIG. 10, in the spherical aberration figure, the value of g-line (a wavelength of 435.8400 nm) is indicated by a two-dot chain line, the value of d-line (a wavelength of 587.5600 nm) is indicated by a solid line, and the value of c-line (a wavelength of 656.2700 nm) is indicated by a dotted line, respectively. In the astigmatism figure, the value on a sagittal image surface is indicated by a solid line, and the value on a meridional image surface is indicated by a dotted line.

It is obvious from each aberration figure that in the fifth value example, various aberrations are reliably corrected and an excellent imaging performance is achieved.

Sixth Embodiment

Figure 11:
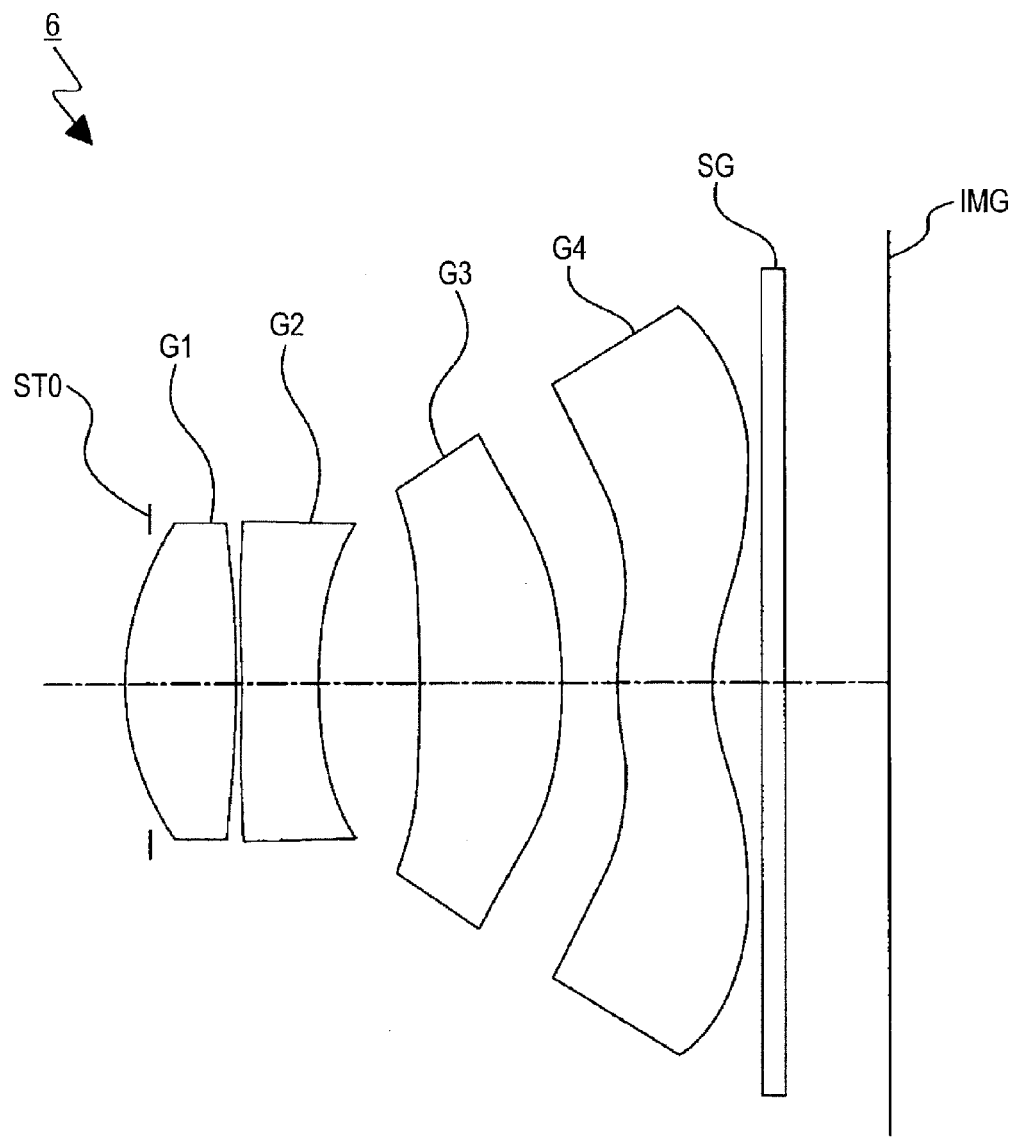
FIG. 11 is a diagram illustrating a lens configuration of an imaging lens according to a sixth embodiment.

FIG. 11 is a diagram illustrating a lens configuration of an imaging lens 6 according to a sixth embodiment.

The imaging lens 6 includes an aperture stop STO, a first lens G1 having a positive refractive power, a second lens G2 having a negative refractive power, a third lens G3 having a positive refractive power, and a fourth lens G4 having a negative refractive power, which are sequentially disposed from the object side to the image side.

The first lens G1 is formed in a convex shape on both sides thereof.

The second lens G2 is formed in a concave shape on both sides thereof, and the absolute value of the paraxial curvature radius of the surface thereof on the image side is smaller than the absolute value of the paraxial curvature radius of the surface thereof on the object side.

The third lens G3 is formed in a meniscus shape in which a concave surface is directed toward the object side.

The fourth lens G4 is formed in a shape in which a surface in the proximity of the optical axis forms a convex surface toward the object side, and has an inflection point in the effective diameter of the surface on the object side and in the effective diameter of the surface on the image side, respectively.

A seal glass SG is disposed between the fourth lens G4 and an image surface IMG.

Lens data of a sixth value example obtained by applying specific values to the imaging lens 6 according to the sixth embodiment is shown together with an F-number "FNo", the focal length "f" of an entire lens system and a field angle "2ω", in Table 11.

TABLE 11

FNo = 2.2
f = 4.4
2ω = 67.5°
sixth value example lens data

| Si surface number | Ri curvature radius | Di interval | Ndi refractive index | νdi Abbe number |
|---|---|---|---|---|
| 1 (STO) | ∞ | −0.160 | — | — |
| 2 | 1.771 | 0.713 | 1.535 | 56.3 |
| 3 | −8.927 | 0.054 | — | — |
| 4 | −28.424 | 0.544 | 1.632 | 23.2 |
| 5 | 3.244 | 0.693 | — | — |
| 6 | −12.424 | 0.967 | 1.535 | 56.3 |
| 7 | −4.791 | 0.380 | — | — |
| 8 | 1.622 | 0.650 | 1.535 | 56.3 |
| 9 | 1.064 | 0.350 | — | — |
| 10 | ∞ | 0.150 | 1.518 | 64.1 |
| 11 | ∞ | 0.700 | — | — |

In the imaging lens 6, both surfaces (the second surface and the third surface) of the first lens G1, both surfaces (the fourth surface and the fifth surface) of the second lens G2, both surfaces (the sixth surface and the seventh surface) of the third lens G3, and both surfaces (the eighth surface and the ninth surface) of the fourth lens G4 are formed as aspherical surfaces. The aspherical coefficients of the aspherical surfaces in the sixth value example are shown together with the conic constants K, in Table 12.

TABLE 12 sixth value example aspherical data

| Si surface number | K conic constant | 3rd | 4th | 5th | 6th | 7th |
|---|---|---|---|---|---|---|
| 1 (STO) | — | — | — | — | — | — |
| 2 | −1.115E+01 | | 2.287E−01 | | −2.314E−01 | |
| 3 | 9.485E+00 | | 4.464E−02 | | −9.577E−02 | |
| 4 | 0.000E+00 | 1.389E−02 | 5.498E−03 | 2.204E−02 | −2.815E−02 | −3.488E−02 |
| 5 | 1.361E+00 | 3.806E−03 | 2.463E−02 | 1.024E−02 | −1.212E−02 | 4.847E−03 |
| 6 | −1.000E+01 | −5.284E−02 | 8.931E−02 | −1.056E−01 | 2.612E−02 | −1.778E−02 |
| 7 | 3.243E+00 | −1.146E−01 | −8.723E−02 | 1.869E−01 | −1.232E−01 | 3.625E−02 |
| 8 | −6.782E+00 | −1.111E−01 | −2.125E−01 | 9.700E−02 | 9.159E−03 | 9.399E−03 |
| 9 | −3.404E+00 | −7.087E−02 | −1.617E−01 | 1.426E−01 | −3.215E−02 | −5.294E−03 |

| Si surface number | 8th | 9th | 10th | 11th |
|---|---|---|---|---|
| 1 (STO) | — | — | — | — |
| 2 | 1.686E−01 | | −5.560E−02 | — |
| 3 | 1.208E−01 | | −5.153E−02 | — |
| 4 | 8.681E−02 | 7.746E−03 | −3.344E−02 | — |
| 5 | 4.216E−02 | −3.261E−02 | 1.510E−02 | — |
| 6 | 2.437E−02 | 5.911E−03 | −9.072E−03 | — |
| 7 | −1.726E−02 | 1.298E−02 | 4.474E−03 | −3.970E−03 |
| 8 | −3.205E−03 | −2.593E−03 | −8.108E−05 | 2.782E−04 |
| 9 | 1.085E−03 | 9.951E−04 | −2.454E−04 | — |

Figure 12:
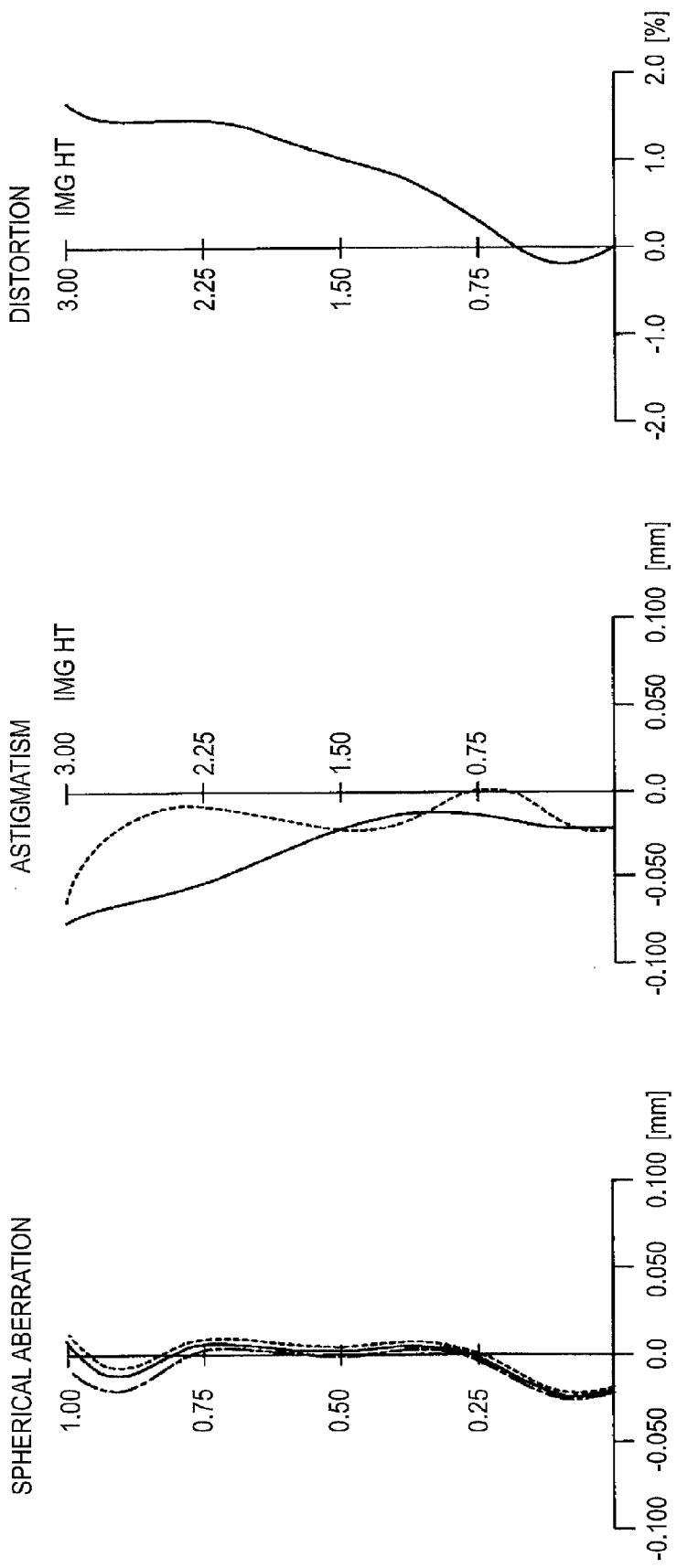
FIG. 12 is a diagram illustrating spherical aberration, astigmatism and distortion of a value example obtained by applying specific values to the sixth embodiment.

FIG. 12 is a diagram illustrating spherical aberration, astigmatism and distortion of the sixth value example.

In FIG. 12, in the spherical aberration figure, the value of g-line (a wavelength of 435.8400 nm) is indicated by a two-dot chain line, the value of d-line (a wavelength of 587.5600 nm) is indicated by a solid line, and the value of c-line (a wavelength of 656.2700 nm) is indicated by a dotted line, respectively. In the astigmatism figure, the value on a sagittal image surface is indicated by a solid line, and the value on a meridional image surface is indicated by a dotted line.

It is obvious from each aberration figure that in the sixth value example, various aberrations are reliably corrected and an excellent imaging performance is achieved.

Seventh Embodiment

Figure 13:
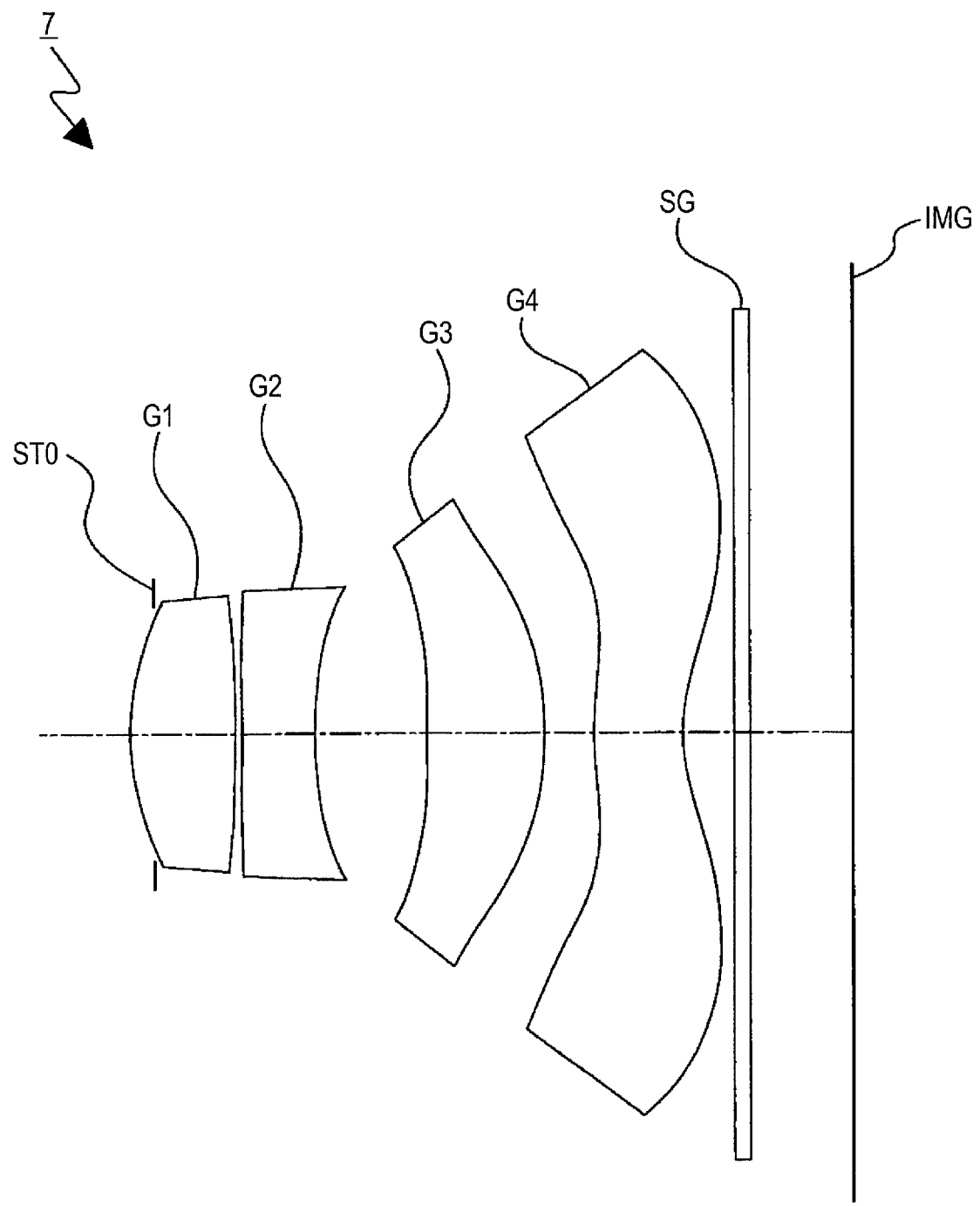
FIG. 13 is a diagram illustrating a lens configuration of an imaging lens according to a seventh embodiment.

FIG. 13 is a diagram illustrating a lens configuration of an imaging lens 7 according to a seventh embodiment.

The imaging lens 7 includes an aperture stop STO, a first lens G1 having a positive refractive power, a second lens G2 having a negative refractive power, a third lens G3 having a positive refractive power, and a fourth lens G4 having a negative refractive power, which are sequentially disposed from the object side to the image side.

The first lens G1 is formed in a convex shape on both sides thereof.

The second lens G2 is formed in a concave shape on both sides thereof, and the absolute value of the paraxial curvature radius of the surface thereof on the image side is smaller than the absolute value of the paraxial curvature radius of the surface thereof on the object side.

The third lens G3 is formed in a meniscus shape in which a concave surface is directed toward the object side.

The fourth lens G4 is formed in a shape in which a surface in the proximity of the optical axis forms a convex surface toward the object side, and has an inflection point in the effective diameter of the surface on the object side and in the effective diameter of the surface on the image side, respectively.

A seal glass SG is disposed between the fourth lens G4 and an image surface IMG.

Lens data of a seventh value example obtained by applying specific values to the imaging lens 7 according to the seventh embodiment is shown together with an F-number "FNo", the focal length "f" of an entire lens system and a field angle "2ω", in Table 13.

TABLE 13

FNo = 2.4
f = 3.2
2ω = 70.8°
seventh value example lens data

| Si surface number | Ri curvature radius | Di interval | Ndi refractive index | vdi Abbe number |
|---|---|---|---|---|
| 1 (STO) | ∞ | −0.124 | — | — |
| 2 | 1.379 | 0.548 | 1.535 | 56.3 |
| 3 | −6.010 | 0.023 | — | — |
| 4 | −68.751 | 0.395 | 1.632 | 23.2 |
| 5 | 2.403 | 0.586 | — | — |
| 6 | −5.625 | 0.621 | 1.535 | 56.3 |
| 7 | −2.196 | 0.261 | — | — |
| 8 | 1.351 | 0.465 | 1.535 | 56.3 |
| 9 | 0.782 | 0.271 | — | — |
| 10 | ∞ | 0.080 | 1.518 | 64.1 |
| 11 | ∞ | 0.538 | — | — |

In the imaging lens 7, both surfaces (the second surface and the third surface) of the first lens G1, both surfaces (the fourth surface and the fifth surface) of the second lens G2, both surfaces (the sixth surface and the seventh surface) of the third lens G3, and both surfaces (the eighth surface and the ninth surface) of the fourth lens G4 are formed as aspherical surfaces. The aspherical coefficients of the aspherical surfaces in the seventh value example are shown together with the conic constants K, in Table 14.

TABLE 14 seventh value example aspherical data

| Si surface number | K conic constant | 3rd | 4th | 5th | 6th | 7th |
|---|---|---|---|---|---|---|
| 1 (STO) | — | — | — | — | — | — |
| 2 | −1.115E+01 | | 4.864E−01 | | −9.613E−01 | |
| 3 | 9.485E+00 | | 5.917E−02 | | −2.765E−01 | |
| 4 | 0.000E+00 | 6.597E−03 | 5.640E−02 | 1.791E−02 | −1.471E−01 | −1.291E−01 |
| 5 | 1.361E+00 | 2.757E−03 | 4.038E−02 | 7.598E−02 | −4.970E−02 | −4.582E−02 |
| 6 | −6.499E+00 | −5.096E−02 | 1.601E−01 | −3.165E−01 | 1.076E−01 | −7.963E−02 |
| 7 | −3.173E−02 | −2.068E−01 | −9.436E−02 | 4.935E−01 | −4.870E−01 | 1.676E−01 |
| 8 | −1.000E+01 | −2.208E−01 | −4.512E−01 | 3.012E−01 | 4.396E−02 | 3.947E−02 |
| 9 | −4.821E+00 | −3.332E−02 | −3.707E−01 | 3.560E−01 | −9.358E−02 | −2.300E−02 |

| Si surface number | 8th | 9th | 10th | 11th |
|---|---|---|---|---|
| 1 (STO) | — | — | — | — |
| 2 | 1.389E+00 | | −9.985E−01 | — |
| 3 | 6.142E−01 | | −4.739E−01 | — |
| 4 | 6.324E−01 | 1.363E−01 | −4.562E−01 | — |
| 5 | 2.036E−01 | −2.261E−01 | 2.692E−01 | — |
| 6 | 1.449E−01 | 3.876E−02 | −1.197E−01 | — |
| 7 | −8.988E−02 | 1.148E−01 | 4.678E−02 | −6.066E−02 |
| 8 | −2.497E−02 | −2.387E−02 | −1.066E−03 | 5.294E−03 |
| 9 | 5.237E−03 | 6.988E−03 | −2.297E−03 | — |

Figure 14:
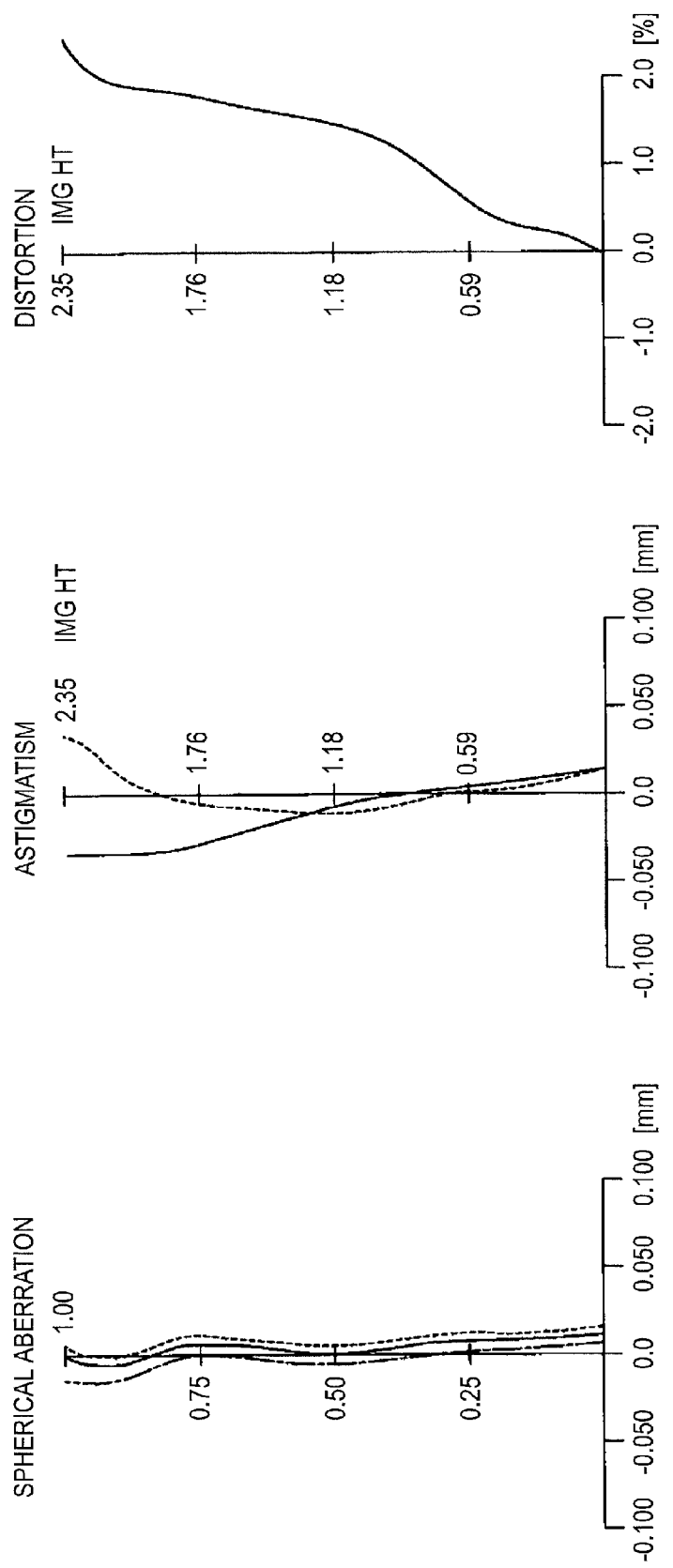
FIG. 14 is a diagram illustrating spherical aberration, astigmatism and distortion of a value example obtained by applying specific values to the seventh embodiment.

FIG. 14 is a diagram illustrating spherical aberration, astigmatism and distortion of the seventh value example.

In FIG. 14, in the spherical aberration figure, the value of g-line (a wavelength of 435.8400 nm) is indicated by a two-dot chain line, the value of d-line (a wavelength of 587.5600 nm) is indicated by a solid line, and the value of c-line (a wavelength of 656.2700 nm) is indicated by a dotted line, respectively. In the astigmatism figure, the value on a sagittal image surface is indicated by a solid line, and the value on a meridional image surface is indicated by a dotted line.

It is obvious from each aberration figure that in the seventh value example, various aberrations are reliably corrected and an excellent imaging performance is achieved.

Eighth Embodiment

Figure 15:
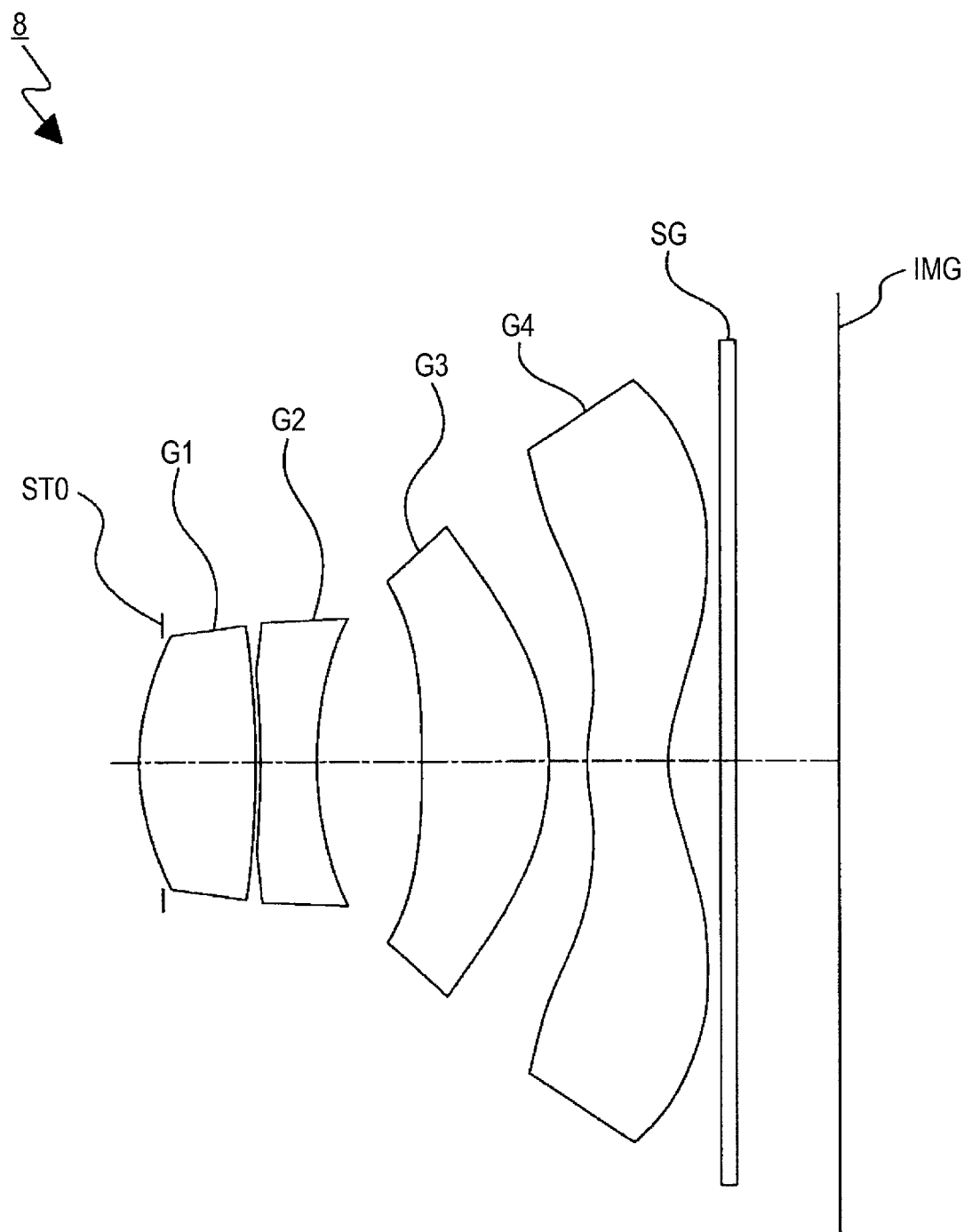
FIG. 15 is a diagram illustrating a lens configuration of an imaging lens according to an eighth embodiment.

FIG. 15 is a diagram illustrating a lens configuration of an imaging lens 8 according to an eighth embodiment.

The imaging lens 8 includes an aperture stop STO, a first lens G1 having a positive refractive power, a second lens G2 having a negative refractive power, a third lens G3 having a positive refractive power, and a fourth lens G4 having a negative refractive power, which are sequentially disposed from the object side to the image side.

The first lens G1 is formed in a convex shape on both sides thereof.

The second lens G2 is formed in a concave shape on both sides thereof, and the absolute value of the paraxial curvature radius of the surface thereof on the image side is smaller than the absolute value of the paraxial curvature radius of the surface thereof on the object side.

The third lens G3 is formed in a meniscus shape in which a concave surface is directed toward the object side.

The fourth lens G4 is formed in a shape in which a surface in the proximity of the optical axis forms a convex surface toward the object side, and has an inflection point in the effective diameter of the surface on the object side and in the effective diameter of the surface on the image side, respectively.

A seal glass SG is disposed between the fourth lens G4 and an image surface IMG.

Lens data of an eighth value example obtained by applying specific values to the imaging lens 8 according to the eighth embodiment is shown together with an F-number "FNo", the focal length "f" of an entire lens system and a field angle "2ω", in Table 15.

TABLE 15

FNo = 2.4
f = 3.9
2ω = 73.4°
eighth value example lens data

| Si surface number | Ri curvature radius | Di interval | Ndi refractive index | νdi Abbe number |
|---|---|---|---|---|
| 1 (STO) | ∞ | −0.160 | — | — |
| 2 | 1.715 | 0.763 | 1.535 | 56.3 |
| 3 | −6.488 | 0.030 | — | — |
| 4 | −43.151 | 0.400 | 1.632 | 23.2 |
| 5 | 3.044 | 0.694 | — | — |
| 6 | −5.419 | 0.851 | 1.535 | 56.3 |
| 7 | −2.153 | 0.262 | — | — |
| 8 | 1.730 | 0.550 | 1.535 | 56.3 |
| 9 | 0.940 | 0.350 | — | — |
| 10 | ∞ | 0.100 | 1.518 | 64.1 |
| 11 | ∞ | 0.700 | — | — |

In the imaging lens 8, both surfaces (the second surface and the third surface) of the first lens G1, both surfaces (the fourth surface and the fifth surface) of the second lens G2, both surfaces (the sixth surface and the seventh surface) of the third lens G3, and both surfaces (the eighth surface and the ninth surface) of the fourth lens G4 are formed as aspherical surfaces. The aspherical coefficients of the aspherical surfaces in the eighth value example are shown together with the conic constants K, in Table 16.

TABLE 16 eighth value example aspherical data

| Si surface number | K conic constant | 3rd | 4th | 5th | 6th | 7th |
|---|---|---|---|---|---|---|
| 1 (STO) | — | — | — | — | — | — |
| 2 | −1.115E+01 | | 2.532E−01 | | −3.286E−01 | |
| 3 | 9.485E+00 | | 3.774E−02 | | −1.190E−01 | |
| 4 | 0.000E+00 | 1.301E−02 | 3.002E−02 | −8.261E−03 | −5.791E−02 | −2.445E−02 |
| 5 | 1.361E+00 | 1.106E−02 | 1.775E−02 | 2.040E−02 | −7.565E−03 | −3.241E−03 |
| 6 | −9.172E+00 | −3.598E−02 | 1.146E−01 | −1.704E−01 | 1.736E−02 | 5.753E−03 |
| 7 | −2.585E+00 | −1.523E−01 | 6.427E−03 | 1.519E−01 | −1.525E−01 | 3.472E−02 |
| 8 | −9.821E+00 | −1.751E−01 | −1.855E−01 | 1.181E−01 | 8.948E−03 | 7.230E−03 |
| 9 | −3.948E+00 | −6.368E−02 | −1.798E−01 | 1.695E−01 | −4.421E−02 | −6.117E−03 |

| Si surface number | 8th | 9th | 10th | 11th |
|---|---|---|---|---|
| 1 (STO) | — | — | — | — |
| 2 | 3.186E−01 | | −1.549E−01 | — |
| 3 | 1.413E−01 | | −5.456E−02 | — |
| 4 | 1.307E−01 | 4.387E−02 | −6.744E−02 | — |
| 5 | 3.092E−02 | −3.735E−02 | 4.530E−02 | — |
| 6 | 3.947E−02 | 1.485E−03 | −2.305E−02 | — |
| 7 | −8.621E−03 | 1.982E−02 | 5.612E−03 | −7.142E−03 |
| 8 | −4.145E−03 | −2.785E−03 | −1.203E−04 | 3.853E−04 |
| 9 | 2.138E−03 | 1.151E−03 | −3.264E−04 | — |

Figure 16:
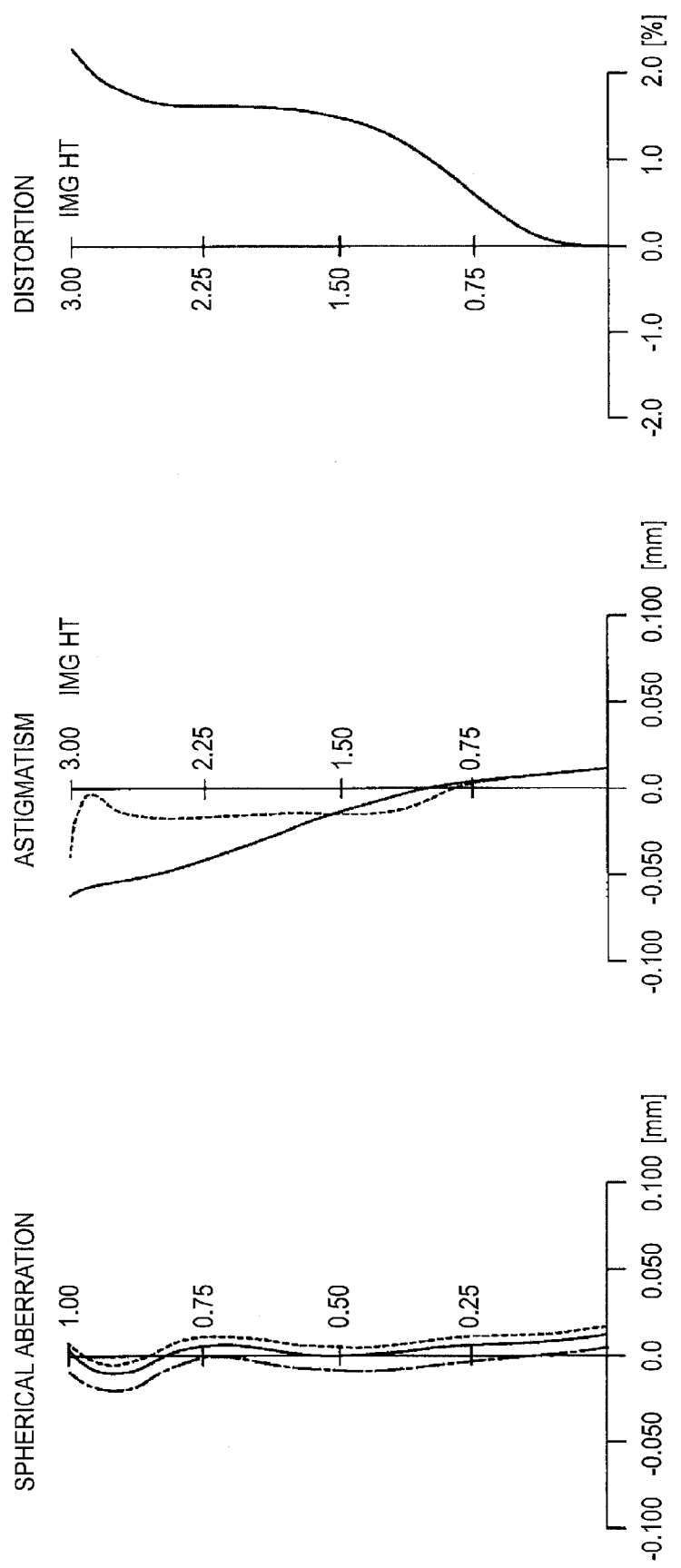
FIG. 16 is a diagram illustrating spherical aberration, astigmatism and distortion of a value example obtained by applying specific values to the eighth embodiment.

FIG. 16 is a diagram illustrating spherical aberration, astigmatism and distortion of the eighth value example.

In FIG. 16, in the spherical aberration figure, the value of g-line (a wavelength of 435.8400 nm) is indicated by a two-dot chain line, the value of d-line (a wavelength of 587.5600 nm) is indicated by a solid line, and the value of c-line (a wavelength of 656.2700 nm) is indicated by a dotted line, respectively. In the astigmatism figure, the value on a sagittal image surface is indicated by a solid line, and the value on a meridional image surface is indicated by a dotted line.

It is obvious from each aberration figure that in the value example 8, various aberrations are reliably corrected and an excellent imaging performance is achieved.

Ninth Embodiment

Figure 17:
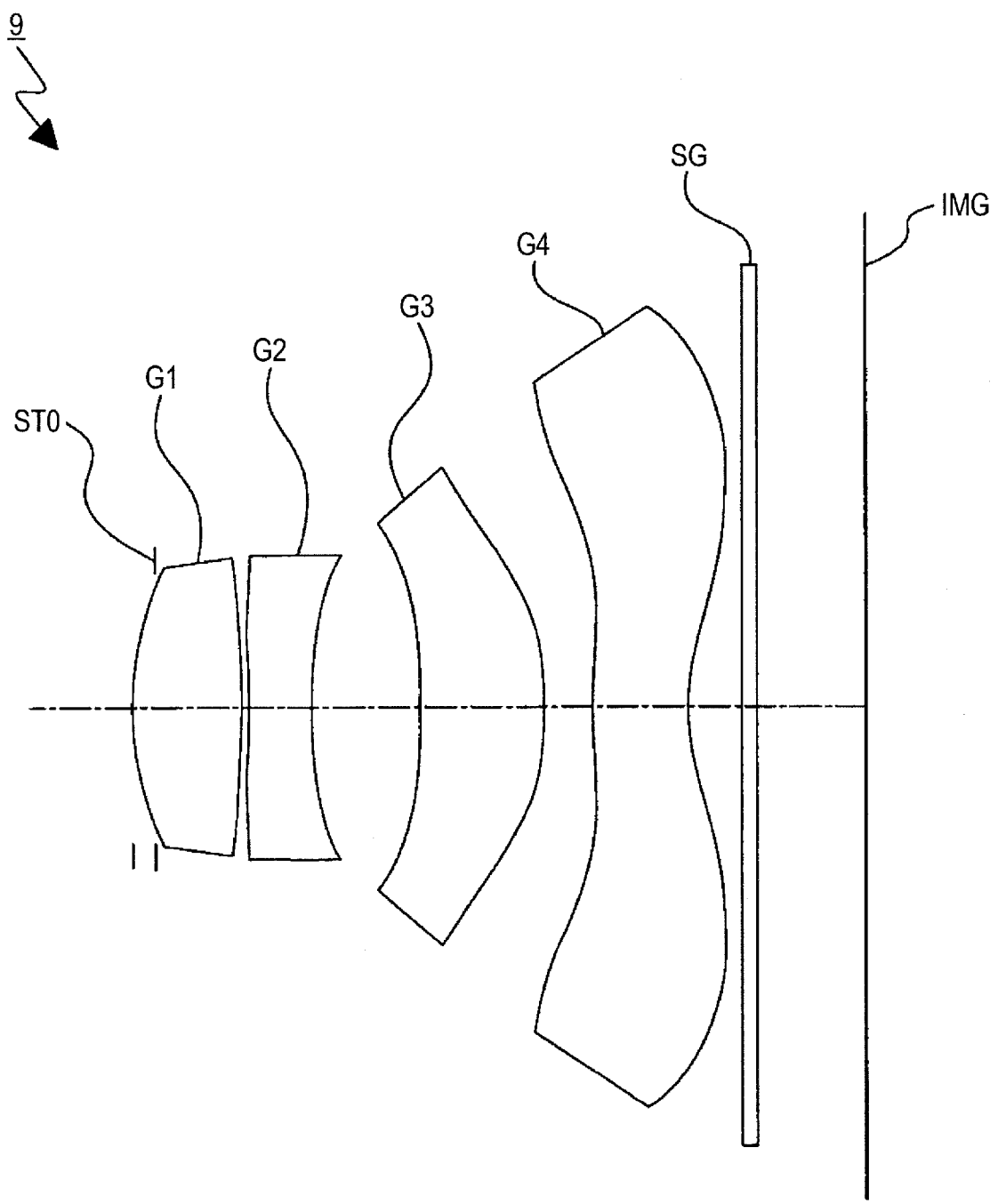
FIG. 17 is a diagram illustrating a lens configuration of an imaging lens according to a ninth embodiment.

FIG. 17 is a diagram illustrating a lens configuration of an imaging lens 9 according to a ninth embodiment.

The imaging lens 9 includes an aperture stop STO, a first lens G1 having a positive refractive power, a second lens G2 having a negative refractive power, a third lens G3 having a positive refractive power, and a fourth lens G4 having a negative refractive power, which are sequentially disposed from the object side to the image side.

The first lens G1 is formed in a convex shape on both sides thereof.

The second lens G2 is formed in a concave shape on both sides thereof, and the absolute value of the paraxial curvature radius of the surface thereof on the image side is smaller than the absolute value of the paraxial curvature radius of the surface thereof on the object side.

The third lens G3 is formed in a meniscus shape in which a concave surface is directed toward the object side.

The fourth lens G4 is formed in a shape in which a surface in the proximity of the optical axis forms a convex surface toward the object side, and has an inflection point in the effective diameter of the surface on the object side and in the effective diameter of the surface on the image side, respectively.

A seal glass SG is disposed between the fourth lens G4 and an image surface IMG.

Lens data of a ninth value example obtained by applying specific values to the imaging lens 9 according to the ninth embodiment is shown together with an F-number "FNo", the focal length "f" of an entire lens system and a field angle "2ω", in Table 17.

TABLE 17

FNo = 2.4
f = 4.0
2ω = 72.6°
ninth value example lens data

| Si surface number | Ri curvature radius | Di interval | Ndi refractive index | νdi Abbe number |
|---|---|---|---|---|
| 1 (STO) | ∞ | −0.160 | — | — |
| 2 | 1.679 | 0.688 | 1.535 | 56.3 |
| 3 | −7.024 | 0.033 | — | — |
| 4 | −41.578 | 0.426 | 1.632 | 23.2 |
| 5 | 3.101 | 0.705 | — | — |
| 6 | −4.004 | 0.789 | 1.535 | 56.3 |
| 7 | −1.926 | 0.309 | — | — |
| 8 | 2.110 | 0.599 | 1.535 | 56.3 |
| 9 | 1.046 | 0.350 | — | — |
| 10 | ∞ | 0.100 | 1.518 | 64.1 |
| 11 | ∞ | 0.700 | — | — |

In the imaging lens 9, both surfaces (the second surface and the third surface) of the first lens G1, both surfaces (the fourth surface and the fifth surface) of the second lens G2, both surfaces (the sixth surface and the seventh surface) of the third lens G3, and both surfaces (the eighth surface and the ninth surface) of the fourth lens G4 are formed as aspherical surfaces. The aspherical coefficients of the aspherical surfaces in the ninth value example are shown together with the conic constants K, in Table 18.

TABLE 18 ninth value example aspherical data

| Si surface number | K conic constant | 3rd | 4th | 5th | 6th | 7th |
|---|---|---|---|---|---|---|
| 1 (STO) | — | — | — | — | — | — |
| 2 | −1.115E+01 | | 2.629E−01 | | −3.382E−01 | |
| 3 | 9.485E+00 | | 3.895E−02 | | −1.325E−01 | |
| 4 | 0.000E+00 | 1.777E−02 | 2.534E−02 | 6.929E−04 | −5.211E−02 | −2.635E−02 |
| 5 | 1.361E+00 | 6.950E−03 | 3.123E−02 | 2.182E−02 | −9.144E−03 | −5.960E−03 |
| 6 | 2.364E+00 | −4.335E−02 | 1.063E−01 | −1.603E−01 | 1.952E−02 | 3.782E−03 |
| 7 | −1.279E+00 | −1.250E−01 | −1.306E−03 | 1.428E−01 | −1.523E−01 | 3.853E−02 |
| 8 | −9.610E+00 | −1.519E−01 | −1.869E−01 | 1.169E−01 | 7.931E−03 | 6.937E−03 |
| 9 | −3.626E+00 | −8.260E−02 | −1.494E−01 | 1.554E−01 | −4.518E−02 | −4.403E−03 |

| Si surface number | 8th | 9th | 10th | 11th |
|---|---|---|---|---|
| 1 (STO) | — | — | — | — |
| 2 | 3.131E−01 | | −1.508E−01 | — |
| 3 | 1.636E−01 | | −7.252E−02 | — |
| 4 | 1.244E−01 | 4.253E−02 | −6.284E−02 | — |
| 5 | 2.798E−02 | −3.617E−02 | 5.300E−02 | — |
| 6 | 3.913E−02 | 1.683E−03 | −2.432E−02 | — |
| 7 | −6.245E−03 | 2.097E−02 | 5.517E−03 | −7.853E−03 |
| 8 | −4.425E−03 | −2.686E−03 | −1.061E−04 | 3.989E−04 |
| 9 | 1.898E−03 | 1.257E−03 | −3.687E−04 | — |

Figure 18:
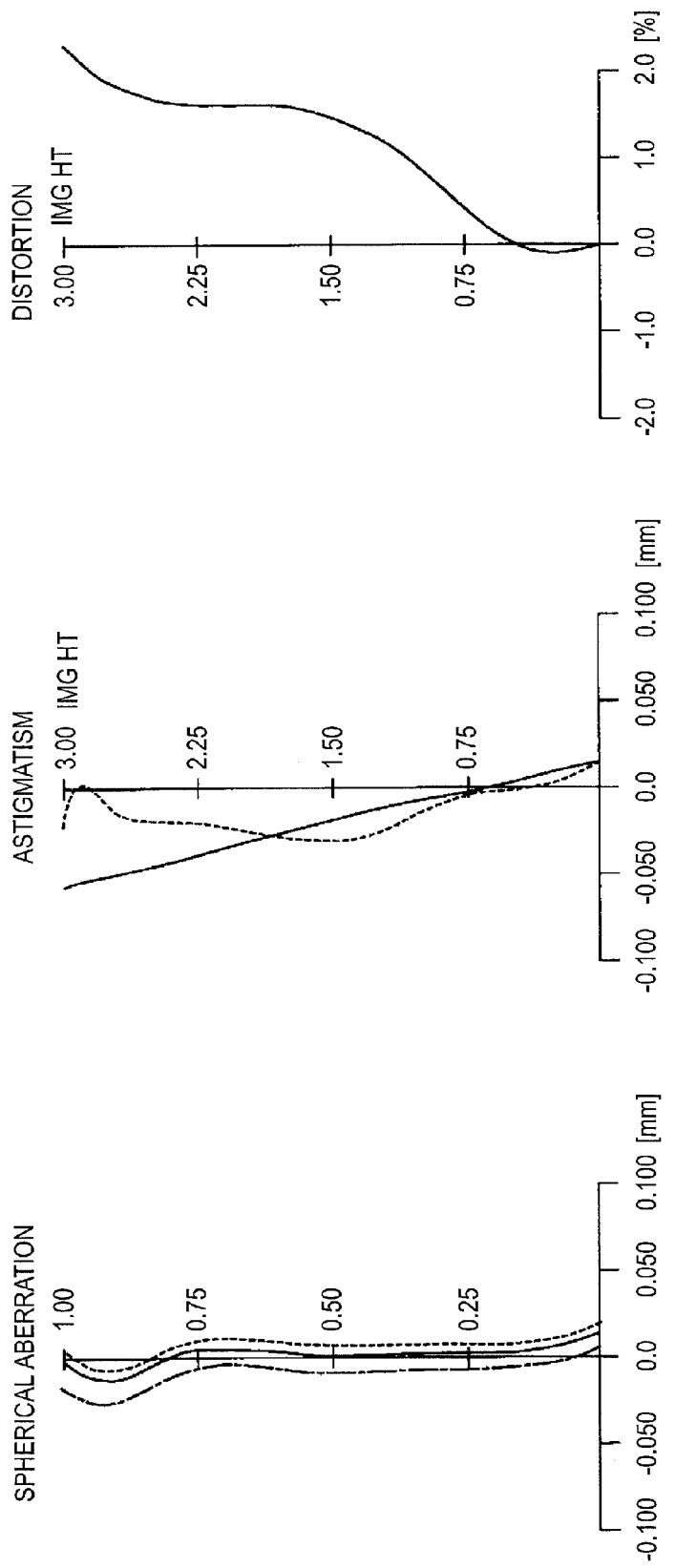
FIG. 18 is a diagram illustrating spherical aberration, astigmatism and distortion of a value example obtained by applying specific values to the ninth embodiment.

FIG. 18 is a diagram illustrating spherical aberration, astigmatism and distortion of the ninth value example.

In FIG. 18, in the spherical aberration figure, the value of g-line (a wavelength of 435.8400 nm) is indicated by a two-dot chain line, the value of d-line (a wavelength of 587.5600 nm) is indicated by a solid line, and the value of c-line (a wavelength of 656.2700 nm) is indicated by a dotted line, respectively. In the astigmatism figure, the value on a sagittal image surface is indicated by a solid line, and the value on a meridional image surface is indicated by a dotted line.

It is obvious from each aberration figure that in the ninth value example, various aberrations are reliably corrected and an excellent imaging performance is achieved.

[Respective Values in Conditional Expressions or the Like of Imaging Lens]

Respective values of the conditional expressions (1) to (7) in the imaging lenses 1 to 9 are shown in Table 19 and Table 20.

TABLE 19

(first column: respective values of conditional expressions)

| | First value example | Second value example | Third value example | Fourth value example | Fifth value example | Sixth value example | Seventh value example | Eighth value example | Ninth value example |
|---|---|---|---|---|---|---|---|---|---|
| Focal length of entire lens system f | 3.712 | 3.220 | 4.180 | 2.850 | 4.700 | 4.400 | 3.230 | 3.940 | 4.000 |
| Focal length of first lens f1 | 2.565 | 2.103 | 2.651 | 1.963 | 2.769 | 2.818 | 2.145 | 2.611 | 2.596 |
| Focal length of second lens f2 | −4.276 | −3.675 | −4.263 | −3.286 | −4.319 | −4.529 | −3.611 | −4.416 | −4.480 |
| Focal length of third lens f3 | 10.424 | 6.233 | 8.353 | 7.624 | 18.881 | 13.908 | 6.312 | 6.100 | 6.100 |
| Focal length of fourth lens f4 | −12.157 | −4.570 | −6.419 | −8.984 | −9.154 | −9.719 | −4.839 | −5.062 | −4.812 |
| Abbe number of first lens νd1 | 56.3 | 56.3 | 56.3 | 56.3 | 56.3 | 56.3 | 56.3 | 56.3 | 56.3 |
| Abbe number of second lens νd2 | 23.9 | 23.9 | 25.6 | 23.9 | 25.6 | 23.2 | 23.2 | 23.2 | 23.2 |
| Paraxial curvature radius of surface on image side of third lens R6 | −4.118 | −3.705 | −9.163 | −3.254 | −11.240 | −12.424 | −5.625 | −5.419 | −4.004 |
| Paraxial curvature radius of surface on image side of third lens R7 | −2.538 | −1.850 | −3.105 | −1.939 | −5.446 | −4.791 | −2.196 | −2.153 | −1.926 |
| Center thickness of fourth lens D8 | 0.550 | 0.462 | 0.600 | 0.377 | 0.700 | 0.650 | 0.465 | 0.550 | 0.599 |
| Paraxial curvature radius of surface on object side of second lens R4 | −48.136 | −29.992 | −11.010 | −80.668 | −29.693 | −28.424 | −68.751 | −43.151 | −41.578 |

TABLE 20

(first column: conditional expressions)

|  | First value example | Second value example | Third value example | Fourth value example | Fifth value example | Sixth value example | Seventh value example | Eighth value example | Ninth value example |
|---|---|---|---|---|---|---|---|---|---|
| (1) 0.40 < f1/|f2| < 0.80 | 0.600 | 0.572 | 0.622 | 0.598 | 0.641 | 0.622 | 0.594 | 0.591 | 0.579 |
| (2) 0.10 < f/f3 < 0.80 | 0.356 | 0.517 | 0.500 | 0.374 | 0.249 | 0.316 | 0.512 | 0.646 | 0.656 |
| (3) 0.20 < f/|f4| < 1.00 | 0.305 | 0.705 | 0.651 | 0.317 | 0.513 | 0.453 | 0.668 | 0.778 | 0.831 |
| (4) vd1 − vd2 > 25 | 32.4 | 32.4 | 30.7 | 32.4 | 30.7 | 33.1 | 33.1 | 33.1 | 33.1 |
| (5) 1.50 < R6/R7 < 4.00 | 1.623 | 2.002 | 2.951 | 1.678 | 2.064 | 2.593 | 2.561 | 2.516 | 2.079 |
| (6) 5.00 < |f4|/D8 < 30.00 | 22.104 | 9.889 | 10.699 | 23.855 | 13.077 | 14.953 | 10.416 | 9.203 | 8.031 |
| (7) 1.00 < R4/f2 < 30.00 | 11.259 | 8.162 | 2.583 | 24.550 | 6.875 | 6.276 | 19.041 | 9.771 | 9.281 |

As is obvious from Table 20, the imaging lenses 1 to 9 satisfy the conditional expressions (1) to (7).

Further, focal lengths of the imaging lenses 1 to 9 in 35 mm version, values of the F-number, and ratios of the total optical length to the diagonal length (length from the center of the imaging device to an opposing angle) of the imaging device are shown in Table 21.

TABLE 21

|  | First value example | Second value example | Third value example | Fourth value example | Fifth value example | Sixth value example | Seventh value example | Eighth value example | Ninth value example |
|---|---|---|---|---|---|---|---|---|---|
| focal length in 35 mm version | 27 | 30 | 30 | 26 | 34 | 32 | 30 | 28 | 29 |
| FNo | 2.4 | 2.4 | 2.4 | 2.4 | 2.2 | 2.2 | 2.4 | 2.4 | 2.4 |
| Total optical length/ Sensor opposing angle | 1.5 | 1.6 | 1.6 | 1.5 | 1.7 | 1.7 | 1.6 | 1.6 | 1.6 |

As shown in Table 21, in the imaging lenses 1 to 9, the focal lengths are 26 mm to 34 mm in 35 mm version, the value of the F-number is 2.2 to 2.4, and the ratios of the total optical length to the diagonal length of the imaging device are 1.5 to 1.7.

[Configuration of Imaging Apparatus]

The imaging apparatus according to the embodiment of the present disclosure includes an imaging lens and an imaging device which converts an optical image formed by the imaging lens into an electric signal. The imaging lens includes an aperture stop, a first lens having a positive refractive power, a second lens having a negative refractive power which is formed in a concave shape on both sides thereof, a third lens having a positive refractive power which is formed in a meniscus shape in which a concave surface is directed toward the object side, and a fourth lens having a negative refractive power in which a convex surface is directed toward the object side, which are sequentially disposed from the object side to the image side.

Accordingly, in the imaging apparatus according to the embodiment of the present disclosure, the positive, negative, positive and negative refractive powers are disposed in the imaging lens, to form an arrangement configuration in which the positive refractive power proceeds.

By forming the second lens in the concave shape on both sides, total reflection ghosting due to off-axis light beams diffuses in a peripheral portion of the lens, so that the ghosting light is prevented from being incident to an imaging device such as a CCD or CMOS, which is effective in correction of coma aberration.

Forming the third lens in the meniscus shape having the positive refractive power is effective in aberration correction, and particularly, is effective in field curvature and astigmatism.

By forming the fourth lens having the negative refractive power in the shape of which the convex surface is directed toward the object side, ghosting light which enters a peripheral portion of the fourth lens is prevented from being incident to the imaging device such as a CCD or CMOS by being reflected from the surface thereof on the object side.

Further, the imaging lens according to the embodiment of the present disclosure satisfies the following conditional expressions (1), (2), (3) and (4).

$$0.40 < f1/|f2| < 0.80 \tag{1}$$

$$0.10 < f/f3 < 0.80 \tag{2}$$

$$0.20 < f/|f4| < 1.00 \tag{3}$$

$$vd1 - vd2 > 25. \tag{4}$$

Here, f1 is the focal length of the first lens, f2 is the focal length of the second lens, f3 is the focal length of the third lens, f4 is the focal length of the fourth lens, f is the focal length of an entire lens system, vd1 is the Abbe number of the first lens, and vd2 is the Abbe number of the second lens.

The conditional expression (1) is a conditional expression relating to an appropriate refractive power distribution of the second lens in the refractive power of the first lens. The reason why the absolute value is used in the focal length of the second lens is because the second lens has the negative refractive power. By setting the first lens and the second lens to have the refractive power arrangement shown in the conditional expression (1), it is possible to obtain an excellent aberration correction effect.

If f1/|f2| is beyond the upper limit of the conditional expression (1), the refractive power of the second lens becomes excessively strong, and it is thus difficult to correct off-axis aberration, and particularly to correct astigmatism and field curvature, which consequently lowers assembly efficiency at the time of manufacturing.

On the other hand, if f1/|f2| is beyond the lower limit of the conditional expression (1), the refractive power of the second lens becomes excessively weak, and it is thus disadvantageous in reduction of the total optical length, which is disadvantageous in miniaturization. Further, it is disadvantageous in correction of chromatic aberration, which makes it difficult to secure an excellent optical performance suitable for a high pixel density imaging device.

For this reason, the imaging lens satisfies the conditional expression (1), and thus, it is possible for the imaging apparatus to achieve miniaturization and to secure an excellent optical performance suitable for a high pixel density imaging device.

The conditional expression (2) is a conditional expression relating to an appropriate refractive power distribution of the third lens in the refractive powers of the lenses of the entire system.

If f/f3 is beyond the upper limit of the conditional expression (2), the refractive power of the third lens becomes excessively strong, and it is thus difficult to correct off-axis aberration, and particularly to correct astigmatism and field curvature, which consequently lowers assembly efficiency at the time of manufacturing.

On the other hand, if f/f3 is beyond the lower limit of the conditional expression (2), the refractive power of the third lens becomes excessively weak, and it is thus disadvantageous in reduction of the total optical length, which is disadvantageous in miniaturization.

For this reason, the imaging lens satisfies the conditional expression (2), and thus, it is possible for the imaging apparatus to achieve miniaturization and to secure an excellent aberration correction performance to thereby secure an excellent optical performance.

The conditional expression (3) is a conditional expression relating to an appropriate refractive power distribution of the fourth lens in the refractive powers of the lenses of the entire system. The reason why the absolute value is used in the focal length of the fourth lens is because the fourth lens has the negative refractive power.

If f/|f4| is beyond the upper limit of the conditional expression (3), the refractive power of the fourth lens becomes excessively strong, and it is thus difficult to correct off-axis aberration, and particularly to correct field curvature and distortion, which consequently lowers assembly efficiency at the time of manufacturing.

On the other hand, if f/|f4| is beyond the lower limit of the conditional expression (3), the refractive power of the fourth lens becomes excessively weak, and it is thus disadvantageous in reduction of the total optical length, which results in deterioration of miniaturization.

For this reason, the imaging lens satisfies the conditional expression (3), and thus, it is possible for the imaging apparatus to achieve miniaturization and to secure an excellent aberration correction performance to thereby secure an excellent optical performance.

The conditional expression (4) is a conditional expression for regulating Abbe numbers in short wavelength of d-line of the first lens and the second lens.

By using a glass material in which the Abbe number is in the range of the conditional expression (4) as the first lens and the second lens, it is possible to perform an excellent chromatic aberration correction. Further, it is possible to suppress occurrence of peripheral coma aberration and field curvature.

As described above, since the imaging lens according to the embodiment of the present disclosure satisfies the conditional expressions (1), (2), (3) and (4), the distribution of the focal lengths of the first lens having the positive refractive power, the second lens having the negative refractive power, the third lens having the positive refractive power and the fourth lens having the negative refractive power is appropriately performed.

Accordingly, it is possible to realize an imaging apparatus which includes an imaging lens in which axial chromatic aberration, spherical aberration and field curvature are reliably corrected, whose brightness is high, whose total optical length is reduced, and which achieves excellent optical performance.

Specifically, it is possible to realize an imaging apparatus which includes an imaging lens in which focal lengths are 26 mm to 34 mm in 35 mm version, values of the F-number are 2.2 to 2.4, and ratios of the total optical length to the diagonal length (length from the center of the imaging device to an opposing angle) of the imaging device are 1.5 to 1.7.

As described above, since the values of the F-number are 2.2 to 2.4, the focal lengths in 35 mm version are 26 mm to 34 mm, and the ratios of the total optical length to the diagonal length of the imaging device are 1.5 to 1.7, it is possible to reduce the total optical length and to realize a bright optical system.

One Embodiment of Imaging Apparatus

Next, an embodiment of the present disclosure in which the imaging apparatus of the present disclosure is applied to a mobile phone will be described (see FIGS. 19 to 21).

Figure 19:
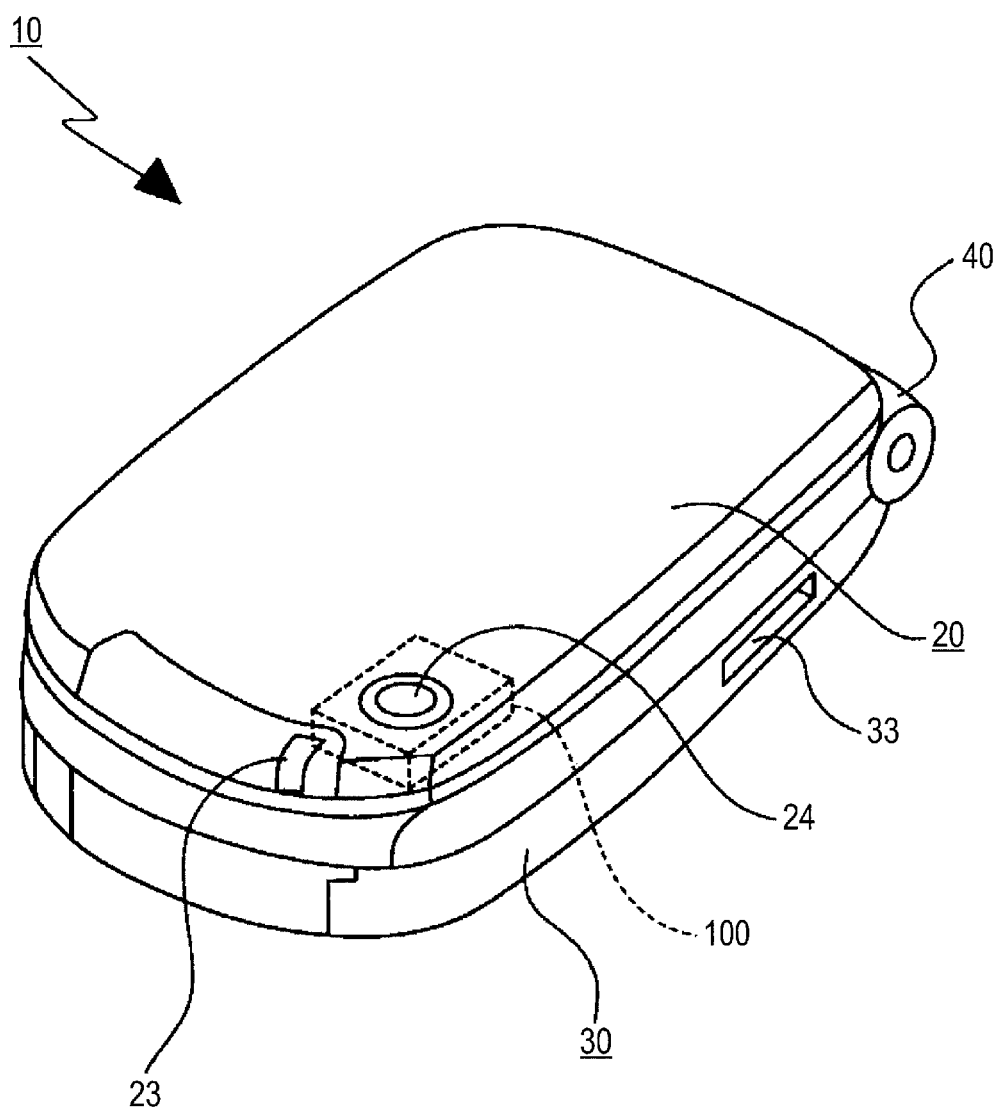
FIG. 19 is a perspective view illustrating a mobile phone in a closed state to which an imaging apparatus according to the present disclosure is applied, which will be more apparent in cooperation with FIGS. 20 and 21.
Figure 20:
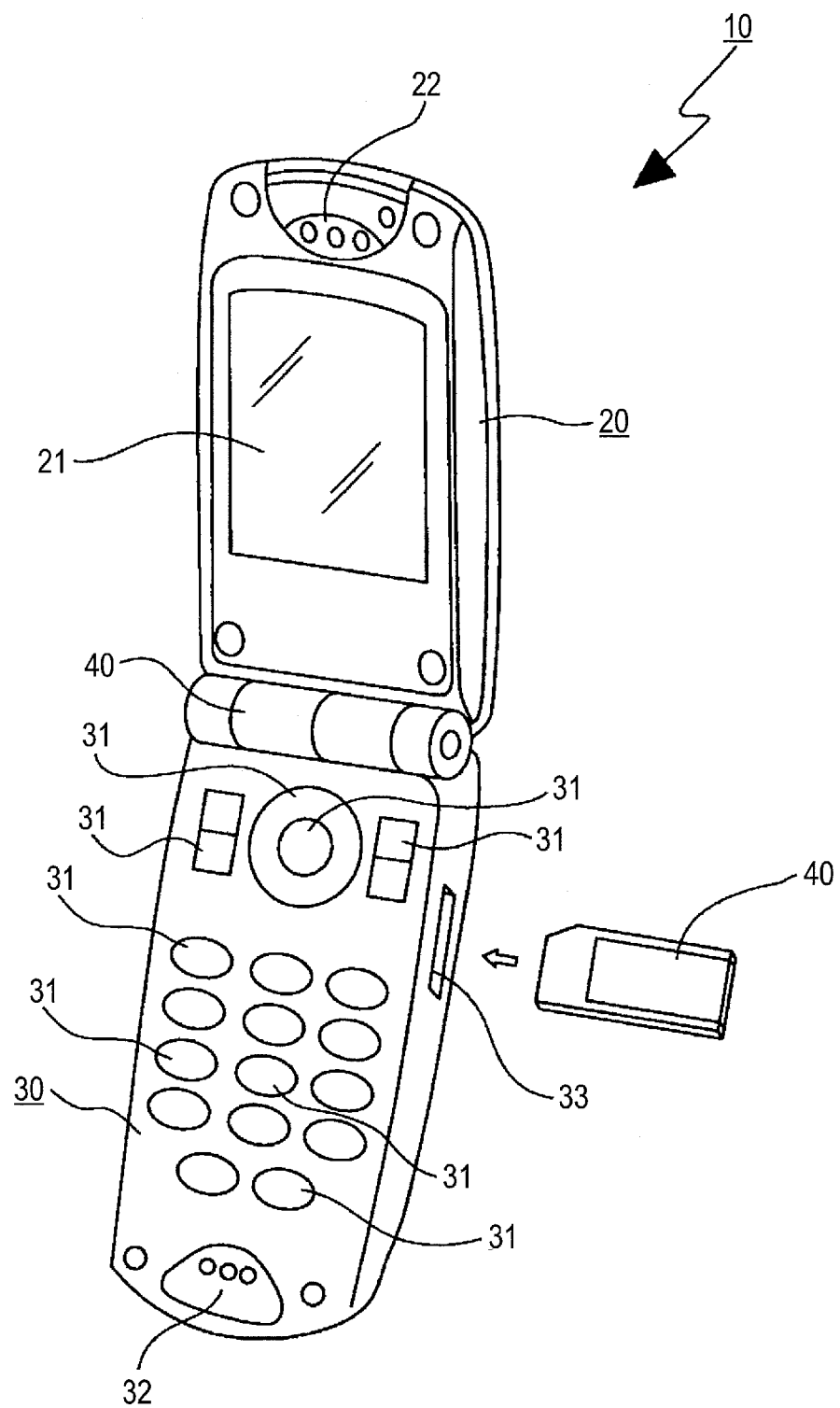
FIG. 20 is a perspective view illustrating the mobile phone in an open state.

As shown in FIGS. 19 and 20, in a mobile phone 10, a display section 20 and a main body 30 are foldably connected by a hinge section 40. The display section 20 and the main body 30 are in a folded state when carried, as shown in FIG. 19. The display 20 and the main body 30 are in an opened state when used, for example, during communication, as shown in FIG. 20.

A liquid crystal display panel 21 is disposed on one surface of the display section 20, and a speaker 22 is installed above the liquid crystal display panel 21. In the display section 20 are assembled an imaging unit 100 which includes an imaging lens 1, an imaging lens 2, an imaging lens 3, an imaging lens 4, an imaging lens 5, an imaging lens 6, an imaging lens 7, an imaging lens 8 or an imaging lens 9. An infrared communication section 23 for performing communication through infrared light is installed in the display section 20.

A cover lens 24 which is positioned on the object side of a first lens G1 of the imaging unit 100 is disposed on the other surface of the display section 20.

A variety of operation keys 31, 31, . . . such as a number keys and a power key are installed on one surface of the main body 30. Further, a microphone 32 is installed on one surface of the main body 30. A memory card slot 33 is formed on a side surface of the main body 30, and a memory card 40 is inserted into or detached from the memory card slot 33.

Figure 21:
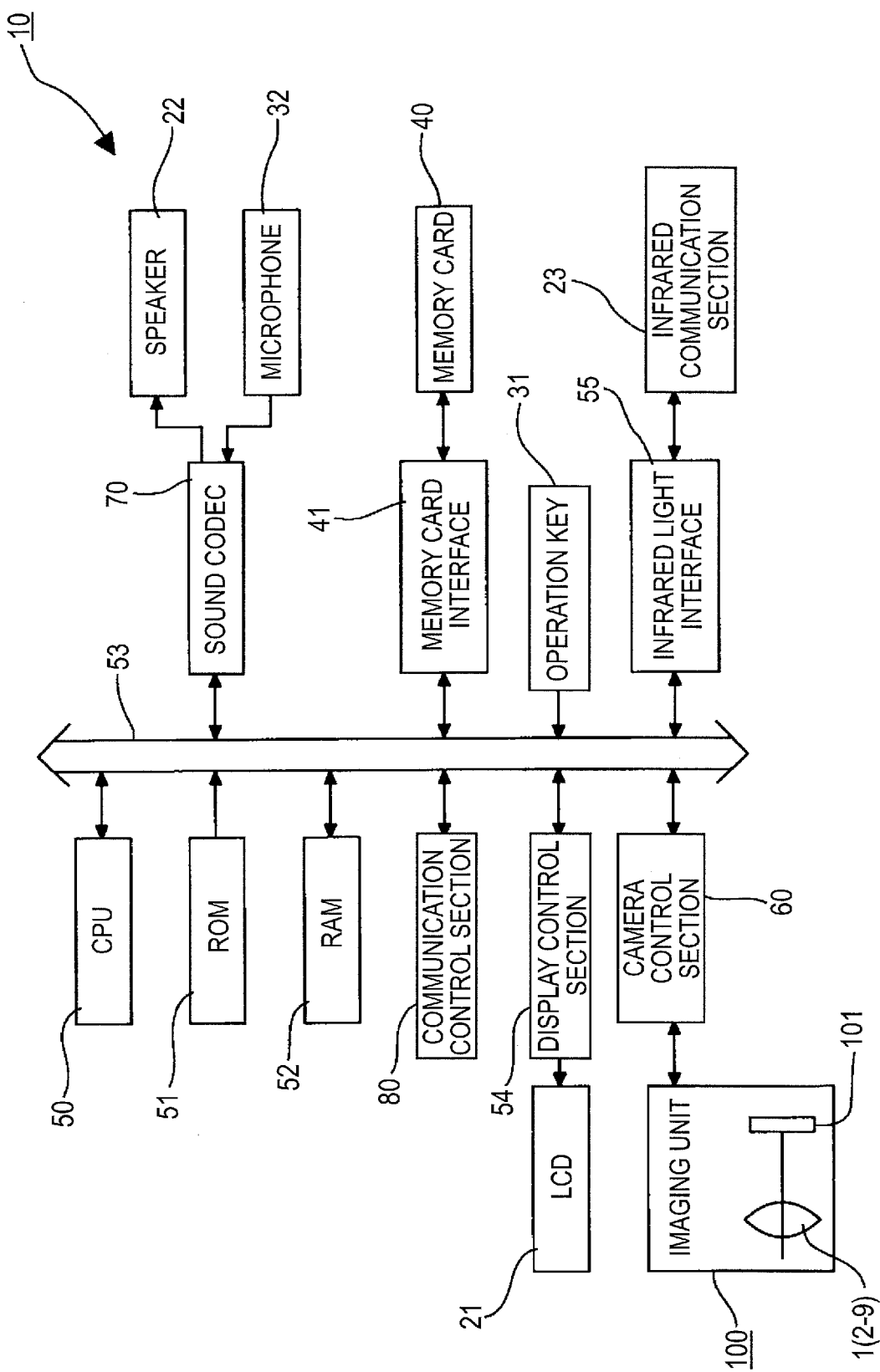
FIG. 21 is a block diagram thereof.

FIG. 21 is a block diagram illustrating a configuration of the mobile phone 10.

The mobile phone 10 includes a CPU (Central Processing Unit) 50, which controls an overall operation of the mobile phone 10. For example, in the CPU 50, a control program stored in a ROM (Read Only Memory) 51 is expanded in a RAM (Random Access Memory) 52, and the operation of the mobile phone 10 is controlled through a bus 53.

A camera control section 60 has a function of controlling the imaging unit 100 to image a still image or a moving image. The camera control section 60 compresses image information obtained by photographing according to JPEG (Joint Photographic Expert Group), MPEG (Moving Picture Expert Group) or the like, and transmits the compressed data to the bus 53. The imaging unit 100 includes an imaging device 101 such as a CCD (Charge Coupled Device) or CMOS (Complementary Metal Oxide Semiconductor), in addition to the imaging lens 1, the imaging lens 2, the imaging lens 3, the imaging lens 4, the imaging lens 5, the imaging lens 6, the imaging lens 7, the imaging lens 8 or the imaging lens 9.

The image information transmitted through the bus 53 is temporarily stored in the RAM 52, and is output to a memory card interface 41 as necessary to be stored in the memory card 40 through the memory card interface 41 or to be displayed on the liquid crystal display panel 21 through the display control section 54. Further, at the same time, during photographing, audio information which is recorded through the microphone 32 is temporarily stored in the RAM 52 through a audio codec 70 or is stored in the memory card 40, and is output from the speaker 22 through the audio codec 70 at the same time when an image is displayed on the liquid crystal display panel 21.

The image information or audio information is output to an infrared light interface 55 as necessary, is output outside through the infrared light communicating section 23 by the infrared light interface 55, and is transmitted to a different apparatus including an infrared light communicating section, for example, a mobile phone, a personal computer, a PDA (Personal Digital Assistant) or the like. When a moving image or a still image is displayed on the liquid crystal display panel 21 on the basis of the image information stored in the RAM 52 or the memory card 40, the camera control section 60 transmits image data obtained by decoding or decompressing a file stored in the RAM 52 or the memory card 40 to the display control section 54 through the bus 53.

A communication control section 80 performs transmission and reception of radio waves between the communication control section 80 and a base station through an antenna (not shown) installed in the display section 20. In an audio communication mode, the communication control section 80 processes the received audio information and outputs the result to the speaker 22 through the audio codec 70. Further, the communication control section 80 receives audio collected by the microphone 32 through the audio codec 70 and performs a predetermined process for the audio to be transmitted.

As described above, since it is possible to reduce the total optical length in the imaging lens 1, the imaging lens 2, the imaging lens 3, the imaging lens 4, the imaging lens 5, the imaging lens 6, the imaging lens 7, the imaging lens 8 and the imaging lens 9, it is possible to easily assemble the imaging lenses into an imaging apparatus such as a mobile phone 10 in which a thin appearance is desired.

In the above-described embodiments, the imaging apparatus is applied to the mobile phone as an example, but the application range of the imaging apparatus is not limited to the mobile phone. That is, the imaging apparatus can be widely applied to a variety of digital input/output devices such as a digital video camera, a digital still camera, a personal computer mounted with a camera or a PDA (Personal Digital Assistant) mounted with a camera.

Any shapes and dimensions of the respective sections shown in the above-described embodiments are only specific examples for implementing the embodiments in practice, and thus should not be interpreted as limiting the technical scope of the present disclosure.

The present disclosure contains subject matter related to that disclosed in Japanese Priority Patent Application JP 2010-278527 filed in the Japan Patent Office on Dec. 14, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging lens comprising:
an aperture stop:
a first lens having a positive refractive power:
a second lens having a negative refractive power which is formed in a concave shape on both sides thereof;
a third lens having a positive refractive power which is formed in a meniscus shape in which a concave surface is directed toward the side of an object; and
a fourth lens having a negative refractive power in which a convex surface is directed toward the object side, which are sequentially disposed from the object side to the image side,
wherein the imaging lens satisfies the following conditional expressions (1), (2), (3) and (4):

$$0.40<|f1/|f2|<.80 \tag{1}$$

$$0.10<f/f3<080 \tag{2}$$

$$0.20<f/|f4|<1.00 \tag{3}$$

$$vd1-vd2>25 \tag{4}$$

where f1 is a focal length of the first lens, f2 is a focal length of the second lens, f3 is a focal length of the third lens, f4 is a focal length of the fourth lens, f is a focal length of an entire lens system, vd1 is an Abbe number of the first lens, and vd2 is an Abbe number of the second lens, and wherein the imaging lens satisfies the following conditional expression (5):

$$1.50<R6/R7<4.00 \tag{5}$$

where R6 is a paraxial curvature radius of the surface on the object side of the third lens, and R7 is a paraxial curvature radius of a surface on the image side of the third lens.

2. The imaging lens according to claim 1, wherein the aperture stop is disposed between a top of the surface on the object side of the first lens in an optical axis direction and an effective diameter thereof.

3. The imaging lens according to claim 1, wherein the imaging lens satisfies the following conditional expression (6):

$$5.00<|f4/D8<30.00 \tag{6}$$

where D8 is a center thickness of the fourth lens.

4. The imaging lens according to claim 1, wherein the imaging lens satisfies the following conditional expression (7):

$$1.00<R4/f2<30.00 \tag{7}$$

where R4 is a paraxial curvature radius of a surface on the object side of the second lens.

5. An imaging apparatus comprising:
an imaging lens; and
an imaging device which converts an optical image formed by the imaging lens into an electrical signal,
wherein the imaging lens includes an aperture stop, a first lens having a positive refractive power, a second lens having a negative refractive power which is formed in a concave shape on both sides thereof, a third lens having a positive refractive power which is formed in a meniscus shape in which a concave surface is directed toward the side of an object, and a fourth lens having a negative refractive power in which a convex surface is directed toward the object side, which are sequentially disposed from the object side to the image side, and wherein the imaging lens satisfies the following conditional expressions (1), (2), (3) and (4):

$$0.40 < f1/|f2| < 0.80 \qquad (1)$$

$$0.10 < f/f3 < 0.80 \qquad (2)$$

$$0.20 < f/|f4| < 1.00 \qquad (3)$$

$$vd1 - vd2 > 25 \qquad (4)$$

where f1 is a focal length of the first lens, f2 is a focal length of the second lens, f3 is a focal length of the third lens, f4 is a focal length of the fourth lens, f is a focal length of an entire lens system, vd1 is an Abbe number of the first lens, and vd2 is the Abbe number of the second lens, and wherein the imaging lens satisfies the following conditional expression (5):

$$1.50 < R6/R7 < 4.00 \qquad (5)$$

where R6 is a paraxial curvature radius of the surface on the object side of the third lens, and R7 is a paraxial curvature radius of a surface on the image side of the third lens.

6. An imaging lens comprising:
an aperture stop;
a first lens having a positive refractive power;
a second lens having a negative refractive power which is formed in a concave shape on both sides thereof;
a third lens having a positive refractive power which is formed in a meniscus shape in which a concave surface is directed toward the side of an object; and
a fourth lens having a negative refractive power in which a convex surface is directed toward the object side, which are sequentially disposed from the object side to the image side, wherein the imaging lens satisfies the following conditional expressions (1), (2), (3) and (4):

$$0.40 < f1/|f2| < 0.80 \qquad (1)$$

$$0.10 < f/f3 < 0.80 \qquad (2)$$

$$0.20 < f/|f4| < 1.00 \qquad (3)$$

$$vd1 - vd2 > 25 \qquad (4)$$

where f1 is a focal length of the first lens, f2 is a focal length of the second lens, f3 is a focal length of the third lens, f4 is a focal length of the fourth lens, f is a focal length of an entire lens system, vd1 is an Abbe number of the first lens, and vd2 is an Abbe number of the second lens, and wherein the value of the F-number of the entire lens system is 2.1 to 2.6.

7. The imaging lens according to claim 1, wherein the value of the F-number of the entire lens system is 2.1 to 2.6.

8. An imaging lens comprising:
an aperture stop;
a first lens having a positive refractive power;
a second lens having a negative refractive power which is formed in a concave shape on both sides thereof;
a third lens having a positive refractive power which is formed in a meniscus shape in which a concave surface is directed toward the side of an object; and
a fourth lens having a negative refractive power in which a convex surface is directed toward the object side, which are sequentially disposed from the object side to the image side, wherein the imaging lens satisfies the following conditional expressions (1), (2), (3) and (4):

$$0.40 < f1/|f2| < 0.80 \qquad (1)$$

$$0.10 < f/f3 < 0.80 \qquad (2)$$

$$0.20 < f/|f4| < 1.00 \qquad (3)$$

$$vd1 - vd2 > 25 \qquad (4)$$

where is a focal length of the first lens, f2 is a focal length of the second lens, f3 is a focal length of the third lens, f4 is a focal length of the fourth lens, f is a focal length of an entire lens system, vd1 is an Abbe number of the first lens, and vd2 is an Abbe number of the second lens, and wherein the total optical length with respect to a diagonal length of the imaging lens is 1.4 to 2.0, the diagonal length being a length from a center of the imaging lens to an opposing angle.

9. The imaging lens according to claim 1, wherein the total optical length with respect to a diagonal length of the imaging lens is 1.4 to 2.0, the diagonal length being a length from a center of the imaging lens to an opposing angle.

10. An imaging lens comprising:
an aperture stop;
a first lens having a positive refractive power;
a second lens having a negative refractive power which is formed in a concave shape on both sides thereof;
a third lens having a positive refractive power which is formed in a meniscus shape in which a concave surface is directed toward the side of an object; and
a fourth lens having a negative refractive power in which a convex surface is directed toward the object side, which are sequentially disposed from the object side to the image side, wherein the imaging lens satisfies the following conditional expressions (1), (2), (3) and (4):

$$0.40 < f1/|f2| < 0.80 \qquad (1)$$

$$0.10 < f/f3 < 0.80 \qquad (2)$$

$$0.20 < f/|f4| < 1.00 \qquad (3)$$

$$vd1 - vd2 > 25 \qquad (4)$$

where f1 is a focal length of the first lens, f2 is a focal length of the second lens, f3 is a focal length of the third lens, f4 is a focal length of the fourth lens, f is a focal length of an entire lens system, vd1 is an Abbe number of the first lens, and vd2 is an Abbe number of the second lens, and wherein the value of the paraxial curvature radius R6 on the surface of the object side of the third lens is −12.424 mm to −3.254 mm.

11. The imaging lens according to claim 1, wherein the value of the paraxial curvature radius R6 on the surface of the object side of the third lens is −12.424 mm to −3.254 mm.

12. The imaging lens according to claim 1, wherein the first lens and the second lens are formed of a glass material.

* * * * *